United States Patent [19]

Kumura et al.

[11] Patent Number: 4,566,354

[45] Date of Patent: Jan. 28, 1986

[54] METHOD AND APPARATUS FOR CONTROLLING REDUCTION RATIO OF CONTINUOUSLY VARIABLE TRANSMISSION WITH ENGINE COOLANT TEMPERATURE COMPENSATION

[75] Inventors: Haruyoshi Kumura, Yokohama; Keiju Abo, Yokosuka; Yoshikazu Tanaka, Yokohama; Hiroyuki Hirano, Yokosuka; Sigeaki Yamamuro, Zushi; Yoshiro Morimoto, Yokosuka, all of Japan

[73] Assignee: Nissan Motor Co., Ltd., Yokohama, Japan

[21] Appl. No.: 486,331

[22] Filed: Apr. 19, 1983

[30] Foreign Application Priority Data

Apr. 19, 1982 [JP] Japan .................................. 57-63867
May 20, 1982 [JP] Japan .................................. 57-83928

[51] Int. Cl.$^4$ ............................................ B60K 41/16
[52] U.S. Cl. ........................................ 74/866; 74/865; 364/424.1
[58] Field of Search ................ 74/866, 865, 844, 857, 74/859, 860, 861; 474/11, 12, 17, 18, 28, 22; 364/424.1

[56] References Cited

U.S. PATENT DOCUMENTS

| | | | |
|---|---|---|---|
| 3,898,894 | 8/1975 | Amo et al. ............................. | 74/866 |
| 4,034,626 | 7/1977 | Udagawa et al. ..................... | 74/857 |
| 4,157,124 | 6/1979 | Poore ................................ | 74/866 X |
| 4,246,807 | 1/1981 | Kofink ................................ | 74/872 |
| 4,262,335 | 4/1981 | Ahlen et al. ....................... | 74/866 X |
| 4,312,249 | 1/1982 | Hau et al. .......................... | 74/866 |
| 4,338,666 | 7/1982 | Suzuki et al. .................... | 74/866 X |
| 4,350,234 | 9/1982 | Suga et al. ......................... | 192/4 A |
| 4,361,060 | 11/1982 | Smyth ................................. | 74/866 |
| 4,387,608 | 6/1983 | Mohl et al. ....................... | 474/18 X |
| 4,458,318 | 7/1984 | Smit et al. ........................ | 474/28 X |

FOREIGN PATENT DOCUMENTS

| | | | |
|---|---|---|---|
| 6033 | 12/1979 | European Pat. Off. . | |
| 37050 | 10/1981 | European Pat. Off. ............ | 74/866 |
| 2947658 | 7/1981 | Fed. Rep. of Germany . | |
| 56-46153 | 4/1981 | Japan . | |
| 56-134658 | 10/1981 | Japan .................................. | 74/866 |
| 1556888 | 11/1979 | United Kingdom ................ | 74/866 |
| 2030661 | 4/1980 | United Kingdom . | |
| 2042658 | 9/1980 | United Kingdom . | |
| 2058256 | 4/1981 | United Kingdom . | |

*Primary Examiner*—Leslie A. Braun
*Assistant Examiner*—Dwight G. Diehl
*Attorney, Agent, or Firm*—Schwartz, Jeffery, Schwaab, Mack, Blumenthal & Evans

[57] ABSTRACT

A method and an apparatus for controlling the reduction ratio of a continuously variable transmission are disclosed wherein when an actual engine coolant temperature indicative signal is greater than or equal to a predetermined value indicative signal, a desired optimum reduction ratio signal is obtained by retrieving the desired optimum reduction ratio signal data stored in a memory versus an engine load and a vehicle speed. When the actual engine coolant temperature indicative signal is less than the predetermined value indicatiive signal, the same desired optimum reduction ratio signal data are retrieved based on a corrected signal which is obtained by correcting an engine load indicative signal or a vehicle speed indicative signal in order to provide a larger reduction ratio. Alternatively, another optimum reduction ratio signal data are retrieved when the actual engine coolant temperature indicative signal is less than the predetermined value indicative signal.

16 Claims, 35 Drawing Figures

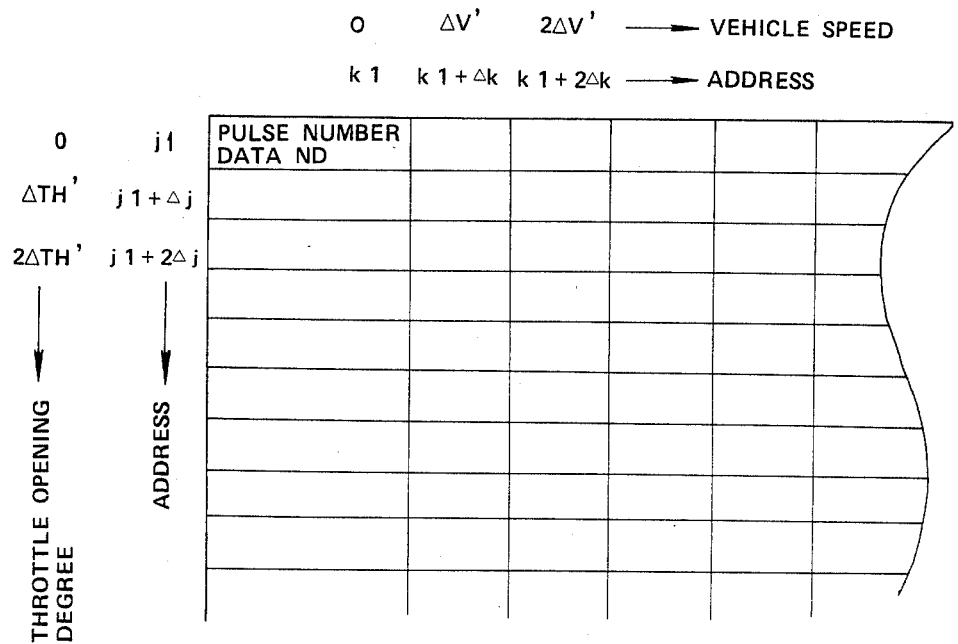

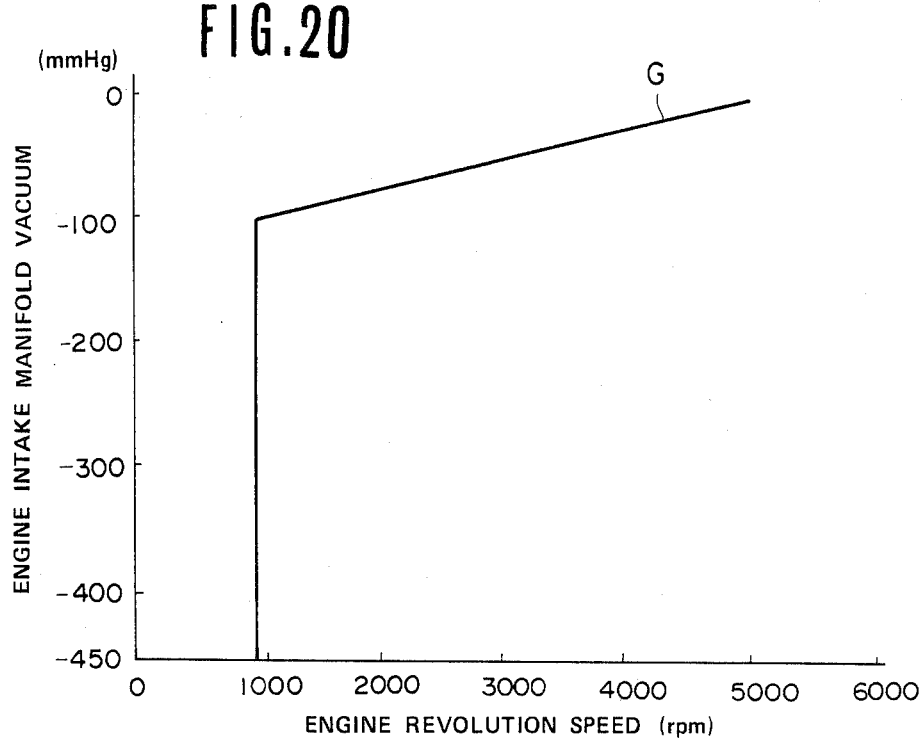
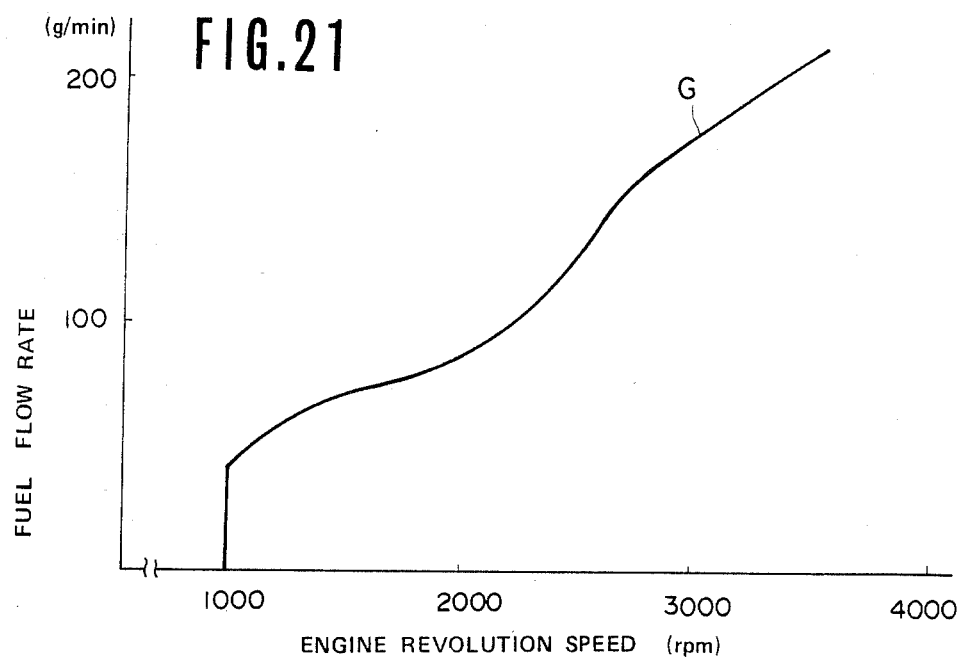

METHOD AND APPARATUS FOR CONTROLLING REDUCTION RATIO OF CONTINUOUSLY VARIABLE TRANSMISSION WITH ENGINE COOLANT TEMPERATURE COMPENSATION

BACKGROUND OF THE INVENTION

1. Field of the Invention

The present invention relates to a method and an apparatus for controlling a reduction ratio of a continuously variable transmission of an automotive vehicle.

2. Description of the Prior Art

In a known continuously variable transmission disclosed in Japanese Patent Application provisional publication No. 56-46153 which appears to correspond to British Patent Application provisional publication GB No. 2,058,256A, the revolution speed of a drive pulley and the engine throttle opening degree (or the engine manifold vacuum) are detected to determine an actual engine operating condition, then the actual engine operating condition is compared with a predetermined ideal engine operating condition determined in accordance with a predetermined shift pattern to provide a deviation therebetween, and then the reduction ratio is controlled to decrease the deviation therebetween.

However, since, in the known continuously variable transmission, the reduction ratio is controlled along the same shift pattern as used in the ordinary operating condition even when the engine coolant temperature is low, the automotive vehicle can not operate smoothly because of a power shortage, and unpleasant engine vibration and engine stalling place during irregular engine operation when the engine coolant temperature is low.

SUMMARY OF THE INVENTION

An object of the present invention is to provide a method and an apparatus for controlling a reduction ratio of a continuously variable transmission of an automotive vehicle having an internal combustion engine wherein the reduction ratio is optimized in response to an actual engine coolant temperature.

According to the present invention, there is provided a method for controlling a reduction ratio of a continuously variable transmission of an automotive vehicle having an internal combustion engine, the method comprising:

(a) generating an actual engine coolant temperature indicative signal representing an actual engine coolant temperature;

(b) comparing the engine coolant temperature indicative signal with a predetermined temperature value indicative signal representing a predetermined temperature value;

(c) detecting at least one operating condition of the automotive vehicle;

(d) generating a desired optimum reduction ratio indicative signal representing a desired optimum reduction ratio for the detected operating condition of the automotive vehicle, the desired optimum reduction ratio indicative signal varying in a first pattern when the engine coolant temperature indicative signal is at least equal to said predetermined temperature value and in a second pattern when the engine coolant temperature indicative signal is less than the predetermined temperature value indicative signal, said second pattern giving a desired optimum reduction ratio larger than a desired optimum reduction ratio given by the first pattern for the same detected operating condition of the automotive vehicle;

(e) adjusting the actual reduction ratio of the continuously variable transmission toward a value which agrees with the desired optimum reduction ratio; and (f) repeating the steps (a), (b), (c), (d) and (e) until the actual reduction ratio agrees with said desired optimum reduction ratio.

According to another aspect of the invention, there is provided an apparatus for controlling a reduction ratio of a continuously variable transmission of an automotive vehicle having an internal combustion engine, the apparatus comprising:

means for generating an actual engine coolant temperature indicative signal representing an actual engine coolant temperature;

means for comparing the engine coolant temperature indicative signal with a predetermined temperature value indicative signal representing a predetermined temperature value;

means for detecting at least one operating condition of the automotive vehicle;

means for generating a desired optimum reduction ratio indicative signal representing a desired optimum reduction ratio for the detected operating condition of the automotive vehicle, the desired optimum reduction ratio indicative signal varying in a first pattern when the engine coolant temperature indicative signal is at least equal to said predetermined temperature value and in a second pattern when the engine coolant temperature indicative signal is less than the predetermined temperature value indicative signal, said second pattern giving a desired optimum reduction ratio larger than a desired optimum reduction ratio given by the first pattern for the same detected operating condition of the automotive vehicle; and means for adjusting the actual reduction ratio of the continuously variable transmission toward a value which agrees with the desired optimum reduction ratio.

BRIEF DESCRIPTION OF THE DRAWINGS

The present invention is more specifically described in connection with the accompanying drawings, wherein:

FIG. 11 is a diagrammatic view illustrating how pulse number data ND are stored in a matrix in the ROM 314 versus throttle opening degree and vehicle speed;

FIG. 12 is a chart illustrating various modes of stepper motor actuating signals applied to output leads 317a, 317c, 317b and 317d of the stepper motor 110;

FIG. 20 is a graph showing the minimum fuel consumption rate curve expressed in terms of intake manifold vacuum and engine revolution speed;

FIG. 21 is a graph showing the minimum fuel consumption rate curve expressed in terms of fuel flow rate;

DETAILED DESCRIPTION OF THE INVENTION

Referring to the accompanying drawings, the present invention is described hereinafter in connection with preferred embodiments.

Figure 1:
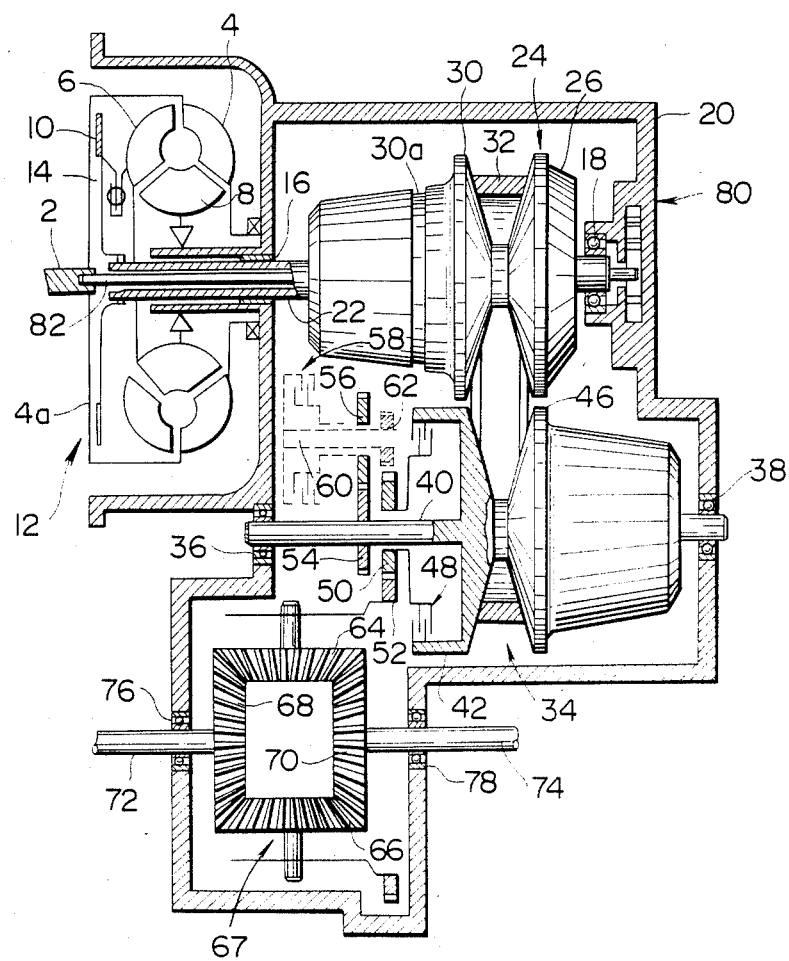
FIG. 1 is a diagrammatic cross sectional view illustrating a power transmission mechanism of a continuously variable V-belt transmission.
Figure 2:
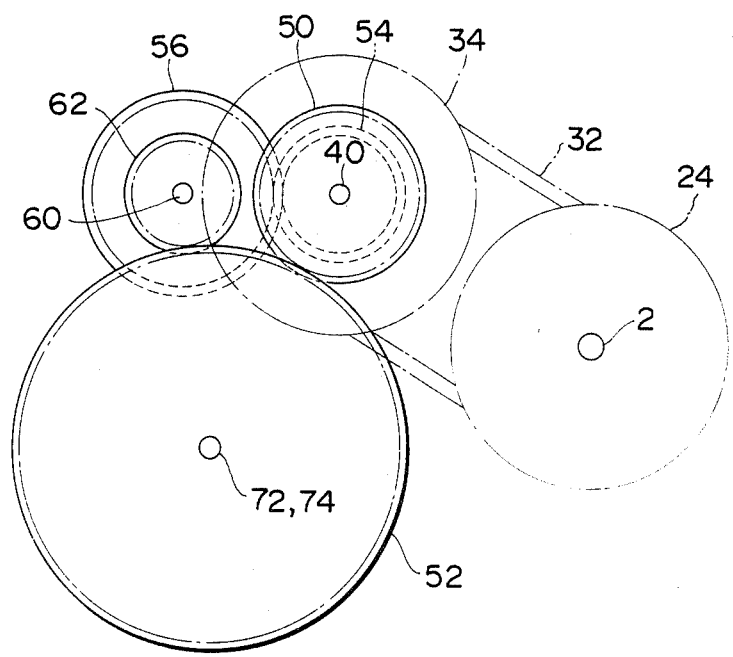
FIG. 2 is a layout of the shafts of the transmission mechanism shown in FIG. 1.

Referring to FIG. 1, a torque converter 12 (which may be replaced with a fluid coupling) includes a pump impeller 4, a turbine runner 6, a stator 8 and a lock-up clutch (lock-up device) 10. The lock-up clutch 10 is connected to the turbine runner 6 in an axially slidable manner and cooperates with a member (converter shell) 4a coupled with the engine output shaft 2 integral with the pump impeller 4 to define a lock-up clutch oil chamber 14. The lock-up clutch 10 operates such that when the oil pressure within the lock-up clutch oil chamber 14 becomes lower than that within the interior of the torque converter 12, the lock-up clutch 10 is pressed against the member 4a by the pressure difference to come into a unitary rotation therewith. The turbine runner 6 is splined to one end of a drive shaft 22 which is rotatably supported by a case 20 via bearings 16 and 18. Arranged on the drive shaft 22 between the bearings 16 and 18 is a drive pulley 24. The drive pulley 24 comprises an axially fixed conical disc 26 secured to the drive shaft 22 and an axially movable conical disc 30 which is so disposed as to face the axially fixed conical disc 26 to define a V-shaped pulley groove therebetween and which is controllably movable in an axial direction of the driven shaft 22 in response to an oil pressure created within a drive pulley cylinder chamber 28 (see FIG. 3). For limiting the maximum width of the V-shaped pulley groove, an annular member 22a is fixed to the drive shaft 22 and so disposed as to engage the driven pulley 34 (see FIG. 3). The drive pulley 24 is drivingly connected to a driven pulley 34 via a V-belt 32. The V-belt 32 runs over the drive pulley 24 and the driven pulley 34. The driven pulley 34 is arranged on a driven shaft 40 which is rotatably supported by the case 20 via the bearings 36 and 38. The driven pulley 34 comprises an axially fixed conical disc 42 secured to the driven shaft 40 and an axially movable conical disc 46 which is so disposed as to face the fixed conical disc 42 in such a manner as to define a V-shaped pulley groove and which is controllably movable in an axial direction of the driven shaft 40 in response to an oil pressure created in a driven pulley cylinder chamber 44 (see FIG. 3). Similarly to the drive pulley 24, an annular member 40a is fixed to the driven shaft 40 to limit the movement of the axially slidable conical disc 46 so as to define the maximum width of the v-shaped pulley groove. The axially fixed conical disc 42 is drivingly connectable via a forward drive multiple disc clutch 48 to a forward drive gear 50 rotatably supported on the driven shaft 40, this forward drive gear being in mesh with a ring gear 52. Fixedly mounted to the driven shaft 40 is a reverse drive gear 54 which is in mesh with an idler gear 56. The idler gear 56 is drivingly connectable via a reverse drive multiple disc clutch 58 to an idler shaft 60 which has fixed thereto another idler gear 62 that is in mesh with the ring gear 52. In FIG. 1, the idler gear 62, idler shaft 60 and reverse drive multiple disc clutch 54 are illustrated in positions displaced from the actual positions thereof for ease of illustration, the idler gear 62 and ring gear 52 are shown as out of mesh with each other. But, they are actually in mesh with each other as shown in FIG. 2. The ring gear 52 has attached thereto a pair of pinion gears 64 and 66. A pair of axle or output shafts 72 and 74 are coupled with side gears 68 and 70, respectively, which are in mesh with the pinion gears 64 and 66 to cooperate to form a differential 67. The axle shafts 72 and 74 are supported via bearings 76 and 78, respectively, extend outwardly of the case 20 in the opposite directions and are connected to road wheels (not shown), respectively. As viewed in FIG. 1, there is arranged on the righthand side of the bearing 18 an oil pump 80 of the internally toothed gearing type which serves as a source of oil pressure, this oil pump 80 being driven by the engine output shaft 2 via an oil pump drive shaft 82 extending through the hollow driven shaft 22.

Rotary power fed from the engine output shaft 2 is transmitted via the torque converter 12, drive shaft 22, drive pulley 24, V-belt 32, driven pulley 34 to driven shaft 40 and in the case the forward multiple disc clutch 48 is engaged with the reverse drive multiple disc clutch 58 released, the rotation of the shaft 40 is transmitted via the forward drive gear 50, ring gear 52 and differential 67 to the axle shafts 72 and 74 to rotate them in the forward rotational direction, whereas, in the case the reverse drive multiple disc clutch 58 is engaged with the forward drive multiple disc clutch 48 released, the rotation of the shaft 40 is transmitted via the reverse drive gear 54, idler gear 56, idler shaft 60, idler gear 62, ring gears 52 and differential 67 to the axle shafts 72 and 74 to rotate them in the reverse rotational direction. During this transmission of power, the ratio between the rotation of the drive pulley 24 and that of the driven pulley 34 may be varied by moving the axially movable conical disc 30 of the drive pulley 24 and the axially movable conical disc 46 of the driven pulley 34 in an axial direction so as to change the radii of the diameter contacting with the V-belt 32. For example, increasing the width of the V-shaped pulley groove of the drive pulley 24 and decreasing the width of the V-shaped pulley groove of the driven pulley 34 will result in a reduction in radius of the diameter of the drive pulley 24 contacting with the V-belt 32 and an increase in radius of the diameter of the driven pulley 34 contacting with the V-belt 32, resulting in an increase in reduction ratio. As a result, a reduction ratio increases. If the axially movable conical discs 30 and 46 are moved in the respective reverse directions, a reduction ratio decreases. Depending upon the situations, the torque converter serves as a torque multiplier or serves as a fluid coupling but, since it has the lock-up clutch 10 as attached to the turbine runner 6, the torque converter 12 can establish a direct mechanical connection between the engine output shaft 2 and driven shaft 22 when the lock-up clutch oil chamber 14 is drained, thus pressing the lock-up clutch 10 against the member 4a integral with the pump impeller 4.

Figure 3:
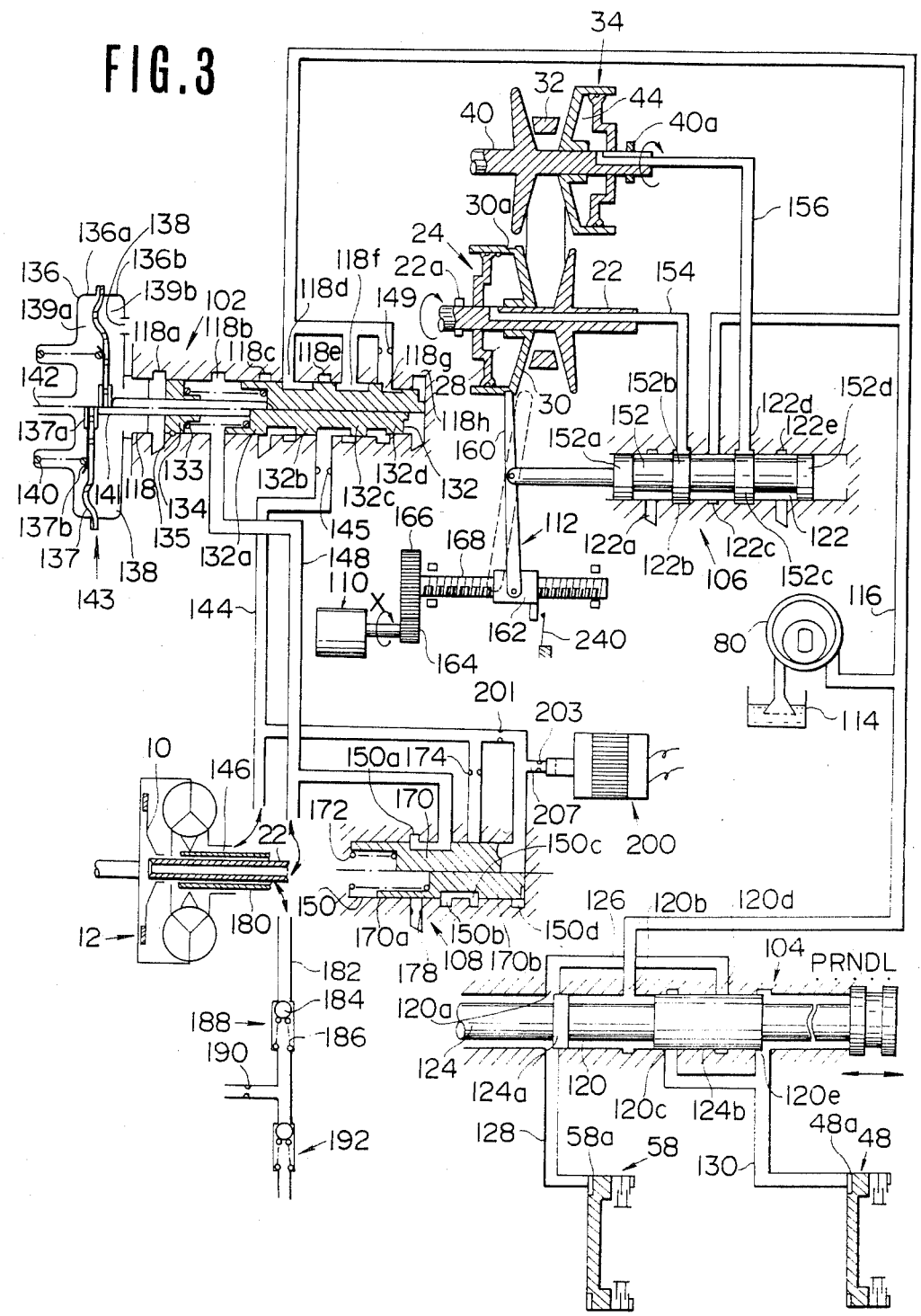
FIG. 3 is a view showing a hydraulic control system for the continuously variable V-belt transmission shown in FIGS. 1 and 2.

Referring to FIG. 3, a hydraulic control system for the continuously variable transmission is explained. As shown in FIG. 3, the control system comprises an oil pump 80, a line pressure regulator valve 102, a manual valve 104, a shift control valve 106, a lock-up valve 108, a shift motor 110, and a shift operating mechanism 112.

The oil pump 80 which is driven by the engine output shaft 2 draws off the oil from the tank 114 and discharges the oil under pressure into the oil conduit 116. The oil conduit 116 leads to ports 118e, 118f and 118g of the line pressure regulator valve 102 where the oil is regulated to generate a pressure oil under line pressure. This pressure oil is hereinafter referred to as a line pressure. The oil conduit 116 communicates with a port 120b of the manual valve 104 and a port 122c of the shift control valve 106.

The manual valve 104 has a valve bore 120 with five ports 120a, 120b, 102c, 102d and 120e, and a spool 124 having thereon two lands 124a and 124b slidably disposed in the valve bore 120. The spool 124 is actuated by a shift lever (not shown) between five detent positions or shift positions for P range, R range, N range, D range and L range. The port 120a is permitted to communicate not only with a port 120d via an oil conduit 126, but also with a cylinder chamber 58a of the reverse drive multiple disc clutch 58. A port 120c is permitted to communicate not only with a port 102e by an oil conduit 130, but also with a cylinder chamber 48a of a forward drive multiple disc clutch 48. The port 120b communicates with the oil conduit 116 to receive the line pressure therein. When the spool 124 is set in P range, the port 120b supplied with the line pressure is covered by a land 124b, so that the cylinder chamber 58a of the reverse drive multiple disc clutch 58 and the cylinder chamber 48a of the forward drive multiple disc clutch 48 are drained via the oil conduit 126 and ports 120d and 120e. When the spool 124 is set in R range, the port 120b is permitted to communicate with the port 120a by a groove between the lands 124a and 124b so as to permit the line pressure to communicate with the cylinder chamber 58a for the reverse drive multiple disc clutch 58, whereas, the cylinder chamber 48a of the forward drive multiple disc clutch 48 is left drained via the port 120e. When the spool 124 is set in N range, the port 120b is disposed between the lands 124a and 124b and is prevented from communicating with the other ports, thus the cylinder chamber 58a of the reverse drive multiple disc clutch 58 and the cylinder chamber 48a of the forward drive multiple disc clutch 48 are drained via the port 120a and port 120e in a similar manner to the case when the spool is set in P range. When the spool 124 is set in D range or L range, the port 120b is permitted to communicate with the port 120c via the groove between the port 120b and 120c so that the line pressure is supplied to the cylinder chamber 48a of the forward multiple disc clutch 48, whereas, the cylinder chamber 58a of the reverse drive clutch 58 is drained via the port 120a. Therefore, when the spool 124 is set in P range or N range, both the forward drive multiple disc clutch 48 and the reverse drive multiple disc clutch 58 are released to interrupt the transmission of power, thus preventing the rotation of output shafts 72 and 74. When the spool 124 is set in R range, the reverse drive multiple disc clutch 58 is engaged so as to drive the axle shafts 72 and 74 in the reverse rotational direction. When the spool 124 is set in D range or L range, the forward drive multiple disc clutch 48 is engaged so as to drive the axle shafts 72 and 74 in the forward rotational direction. Although there occurs no difference in the hydraulic circuit between the case where D range is selected and the case where L range is selected as mentioned above, both of the ranges are electrically detected to actuate the shift motor 110 in such a manner as to effect a shift control in accordance with different shift patterns.

The line pressure regulator valve 102 comprises a valve bore 118 with eight ports 118a, 118b, 118c, 118d, 118e, 118f, 118g and 118h; a spool 132 having thereon four lands 132a, 132b, 132c, and 132d, and a spring 133c disposed on the lefthand side of the spool 132; and a spring seat 134 fixed relative to the valve bore 118 by a pin 135. It is to be noted that the land 132d on the righthand end of the spool 132 is smaller in diameter than the middle lands 132a, 132b and 132c. A vaccum diaphragm 143 is arranged on the inlet of the bore 118. The vacuum diaphragm 143 is constructed of two parts 136a and 136b which clamp therebetween a diaphragm 137 and cooperate with each other to form a casing 136. The casing 136 is divided by the diaphragm 137 into two chambers 139a and 139b. Attached by a fixer 137a to the diaphragm 137 is a spring seat 137b with which a spring 140 is disposed in the chamber 139a biasing the diaphragm 137 to the right. The intake manifold vacuum is introduced into the chamber 139a via a port 142, while the other chamber 139b is vented to the atmosphere via a port 138. Arranged between the diaphragm 137 of the vacuum diaphragm 143 and the spool 132 is a rod 141 extending through the spring seat 134 so as to apply a rightwardly directed bias force to the spool 132. The arrangement is such that this bias force increases as the intake manifold vacuum decreases or becomes small. That is, if the intake manifold vacuum is small (i.e., if the intake manifold vacuum is near the atmospheric pressure), a large rightwardly directed force by the spring 140 is applied to the spool 132 through the rod 141 since a difference in pressure between the chambers 139a and 139b is small and thus the leftwardly directed force caused by this pressure difference and applied to the diaphragm 137 is small. In the reverse case where the intake manifold vacuum is large, the force applied to the spool 132 becomes small since the leftwardly directed force caused by the pressure difference between the chambers 139a and 139b becomes large and thus the rightwardly directed force by the spring 140 decreases correspondingly. The ports 118d, 118f and 118g of the line pressure regulator valve 102 are supplied with the oil under pressure from the oil pump 80, and the inlet to the port 118g is provided with an orifice 149. The ports 118a, 118c and 118h are at all times drained, and the port 118e is connected by an oil conduit 144 with the torque converter inlet port 146 and also with the ports 150c and 150d of the lock-up valve 108, and the port 118b is connected by an oil conduit 148 with the port 150b of the lock-up valve 108 and also with the lock-up clutch oil chamber 14. For preventing the application of an excessive pressure to the interior of the torque converter 12, the oil conduit 144 is provided with an orifice 145. Consequently, three forces act on the spool 132 in the rightward direction, i.e., one by the spring 133, another by the vacuum diaphragm 143 via the rod 141 and the other by the oil pressure applied to the left end of the land 132a via the port 118b. One force acts on the spool 132 in the leftward direction by the line pressure at the port 118g acting on differential area between the lands 132c and 132d. The spool 132 effects pressure regulation to provide the line pressure at the port 118d by adjusting the amount of drainage oil passing from the ports 118f and 118d to the respective ports 118e and 118c (i.e., first of all the oil is drained from the port 118f to the port 118e and, if more drainage is demanded, the oil is drained from the port 118d to the port 118c) until the rightwardly directed forces balance with the leftwardly directed force. As a result, the line pressure increases as the engine intake manifold vacuum drops and it increases as the oil pressure building up in the port 118b (i.e., the same pressure as in the lock-up clutch oil chamber 14) increases. Because, (in this case, the oil pressure exists in the oil chamber 14, the torque converter 12 is in a non lock-up state and serves as a torque multiplier. The variation in the line pressure in this manner meets the actual demands, i.e., the line pressure must be increased to increase a bracing force with which each of the pulleys 24 and 34 are biased against the V-belt 32 in response to an increase in the torque to be transmitted via the pulleys which increases as the engine load increases, i.e., as the intake manifold vacuum decreases, and besides the line pressure must be increased to increase the torque to be transmitted via the pulley as the multiplication of torque by the torque converter 12 increases.

The shift control valve 106 has a valve bore 122 with five ports 122a, 122b, 122c, 122d and 122e, and a spool 152 slidably disposed in the valve bore 122 and having thereon four lands 152a, 152b, 152c and 152d. The center port 122c communicates with the oil conduit 116 and is supplied with the line pressure, the left port 122b and the right port 122d communicate via respective conduits 154 and 156 with the drive pulley cylinder chamber 28 of the drive pulley 24 and the driven pulley cylinder chamber 44 of the driven pulley 34. Both of the end ports 122a and 122e are drained. The left end of the spool 152 is linked to a substantially middle portion of a lever 160 of the later-mentioned shift operating mechanism 112. The width of each of the lands 152b and 152c is set slightly shorter than the width of the respective ports 122b and 122d, and the distance between the lands 152b and 152c is set substantially the same as that between the ports 122b and 122d. Therefore, a portion of the line pressure supplied via the port 122c to the oil chamber between the lands 152b and 152c is allowed to pass through a clearance formed between the land 152b and the port 122b to flow into an oil conduit 154, but the remaining portion thereof is allowed to pass through another clearance formed between the land 152b and the port 122b to be drained, so that the pressure within the oil conduit 154 is determined depending upon the ratio between the areas of the above-mentioned clearances. In a similar manner, the pressure within the oil conduit 156 is determined depending upon the ratio of the areas of clearances formed between the edges of the land 152c and the port 122d. Therefore, if the spool 152 is disposed in the center position, the relationship of the land 152b with the port 122b becomes equal to that of the land 152c with the port 122d, thus causing the pressure in the oil conduit 154 to become equal to that in the oil conduit 156. As the spool 152 moves leftwardly, the clearance of the port 122b on the line pressure side increases and the clearance thereof on the drain side decreases, thus allowing the pressure in the oil conduit 154 to increase accordingly, whereas, the clearance of the port 122d on the line pressure side decreases and the clearance thereof on the drain side increases, thus causing the pressure in the oil conduit 156 to decrease accordingly. This causes an increase in pressure in the drive pulley cylinder chamber 28 of the drive pulley 24, resulting in a decrease in the width of the V-shaped pulley groove, and a reduction in pressure in the driven pulley cylinder chamber 44 of the driven pulley 34, resulting in an increase in the width of the V-shaped pulley groove, so that because the radius of the diameter of the drive pulley 24 contacting with the V-belt increases and the radius of the diameter of the driven pulley 34 contacting with the V-belt decreases, a reduction ratio decreases. If the spool 152 is urged to move rightwardly, the reverse action to that mentioned above proceeds to cause an increase in the reduction ratio.

The lever 160 of the shift operating mechanism 112, which lever is pin connected at its middle portion with the spool 152 of the shift control valve 106, has its one end received in an annular groove 30a formed in the axially movable conical disc 30 of the drive pulley 24 and has its opposite end pin connected with the sleeve 162. The sleeve 162 is internally threaded to mesh with the thread formed on the shaft 168 which is rotatable by the shift motor 110 via the gears 164 and 166. With this shift operating mechanism 112, if the shift motor 110 is rotating to rotate the shaft 168 via the gears 164 and 166 in one rotatioal direction to cause the sleeve 162 to move leftwardly, the lever 160 moves in a clockwise rotational direction with its end portion received by the annular groove 30a of the axially movable conical disc 30 of the drive pulley 24 as a fulcurum point, causing the leftward movement of the spool 152 connected to the lever 160 of the shift control valve 106. This causes a rightward movement of the axially movable conical disc 30 of the drive pulley 24 in a manner mentioned before to decrease the width of the V-shaped pulley groove, while, at the same time, the width of the V-shaped pulley groove of the driven pulley 34 increases, thus resulting in a decrease in the reduction ratio. Since the one end of the lever 160 is engaged with the groove 30a around the outer periphery of the axially movable conical disc 30, urging the axially movable conical disc 30 to move rightwardly will rotate the lever 160 clockwise with that end of the lever 160 which is pin connected with the sleeve 162 as a fulcrum. This causes the spool 152 to move back rightwardly, tending to render the drive pulley 24 and driven pulley 34 to assume the state accomplishing a large reduction ratio. This action causes the spool 152 and the drive pulley 24 and driven pulley 34 to assume a state accomplishing a reduction ratio depending upon the amount of rotation of the shift motor 110. It goes the same if the shift motor 110 is rotated in the reverse direction. Therefore, if the shift motor 110 is actuated in accordance with a predetermined shift pattern, the reduction ratio varies accordingly, thus making it possible to control the reduction ratio in the continuously variable transmission by controlling the shift motor 110, alone.

The shift motor 110 is controlled by a control unit 300 which is described later in more detail in connection with FIG. 4.

The lock-up valve 108 comprises a valve bore 150 formed with four ports 150a, 150b, 150c and 150d, a spool 170 having two lands 170a and 170b, a spring 172 biasing the spool 170 rightwardly, and a lock-up solenoid 200 provided in the oil conduit communicating with the port 150d. The port 150a is drained. The port 150b communicates via an oil conduit 148 with the port 118b of the line pressure regulator valve 102 and also with the lock-up clutch oil chamber 14 within the torque converter 12. The ports 150c and 150d are connected with each other via an orifice 201. A branch oil conduit 207 is formed between the port 150d and the orifice 201. The branch oil conduit 207 opens via an orifice 203 and has its outlet to be closed or opened by the lock-up solenoid 200 in response to on state thereof or off state thereof. The size of the orifice 203 is greater than that of the orifice 201. When the lock-up solenoid 200 is in the on state, the spool 170 is pressed against the force of the spring 172 toward the left because the same oil pressure as that supplied to the torque converter inlet port 146 is supplied to the port 150d from the oil conduit 144 as a result of closing of the outlet of the branch oil conduit 207. In this state, the port 150c is blocked by the land 170b and the port 150b is allowed to drain toward the port 150a. As a result, the lock-up clutch oil chamber 14 which has been connected with the oil pressure via the port 150b and the oil conduit 148 is drained, allowing the lock-up clutch 10 to be engaged under the influence of the pressure in the torque converter 12, thus putting the torque converter 12 into lock-up state where the torque converter does not serve as a torque converter. In the reverse case when the lock-up solenoid 200 is put into the off state, the spool 170 is moved in the rightward direction by the rightwardly directed force by the spring 172 and the port 150b is allowed to communicate with the port 150c since the oil pressure at the port 150d drops due to uncovering of the outlet of the branch oil conduit 207 (the portion of the oil conduit 144 which is subjected to this drop in pressure is confined to a portion between the orifice 201 and the port 150d leaving the remainder of the oil conduit 144 unaffected to this pressure drop owing to the provision of the orifice 201) and this causes the force biasing the spool 170 to the left to disappear. As a result, the oil conduit 148 is allowed to communicate with the oil conduit 144, applying the same oil pressure as that applied to the torque converter inlet port 146 to the lock-up clutch oil chamber 14, causing the pressure on the both sides of the lock-up clutch 10 to become equal to each other, resulting in the release of the lock-up clutch 10. An orifice 174 is provided in the inlet of the port 150c and another orifice 178 is provided in the drain oil conduit connected with the port 150a. The orifice 178 is provided to prevent rapid drainage of the oil pressure from the lock-up clutch oil chamber 14 so as to alleviate a shock upon shifting into the lock-up state, whereas, the orifice 174 is provided in the oil conduit 144 to permit a gradual increase in oil pressure within the lock-up oil chamber 14 so as to alleviate a shock upon release from the lock-up state.

The torque converter outlet port 180 communicates with the oil conduit 182 which is provided with a relief valve 188 including a ball 184 and a spring 186 and thus, with this relief valve, the pressure within the torque converter 12 is maintained within normal operating pressure range. The oil downstream of the relief valve 188 is introduced by an oil conduit 190 to an oil cooler and a lubricant circuit, both being not illustrated, and is finally drained, whereas, an excessive oil is drained by another relief valve 192, the thus drained oil being returned finally to a tank 114.

Next, an explanation is made regarding the control unit 300 which controls the shift motor 110 and the lock-up solenoid 200. The shift motor 110 is a stepper motor and thus referred hereinafter to as the stepper motor.

Figure 4:
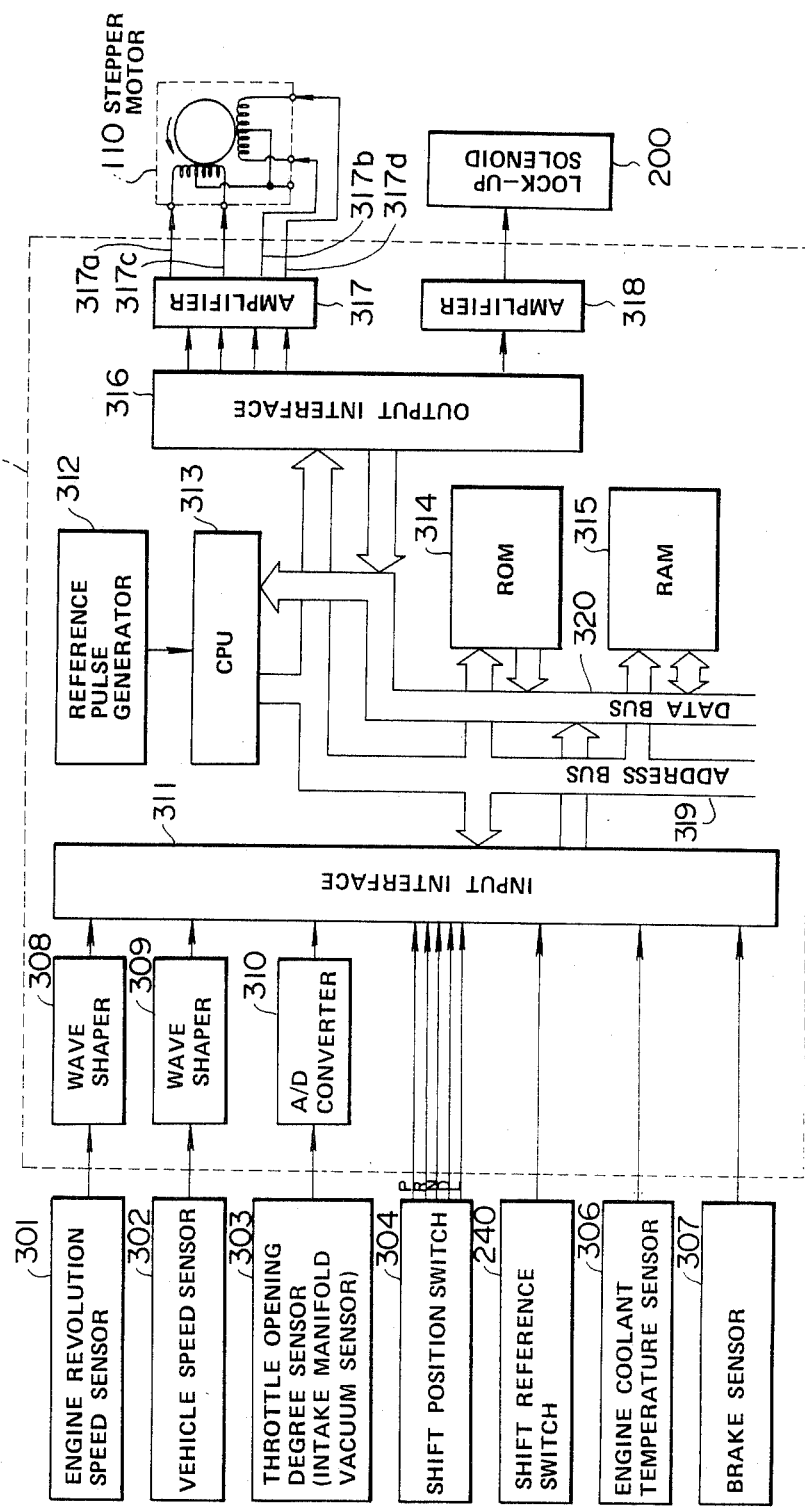
FIG. 4 is a block diagram showing a control unit for controlling a stepper motor 110 and a lock-up solenoid 200 shown in FIG. 3.

As shown in FIG. 4, the control unit 300 receives input signals from an engine revolution speed sensor 301, a vehicle speed sensor 302, a throttle opening degree sensor 303, a shift position switch 304, a shift reference switch 240, an engine coolant temperature sensor 306, and a brake sensor 307. The engine revolution speed sensor 301 detects an engine revolution speed by measuring the number of ignition spark pulses of the engine per unit time, and the vehicle speed sensor 302 detects a vehicle speed by measuring the revolution of the output shaft of the continuously variable transmission. The throttle opening degree sensor 303 detects the engine load by measuring the engine throttle opening degree, and generates an electric voltage signal. The throttle opening degree sensor 303 may be replaced with an intake manifold vacuum sensor or a fuel flow rate sensor. The shift position switch 304 detects which one of the range positions, namely, P range, N range, D range, and L range, is selected by the manual valve 104. The shift reference switch 240 is turned on when the sleeve 162 of the shift operating mechanism 112 assumes a position corresponding to the largest reduction ratio. For this purpose, the shift reference switch 240 is disposed such that it is turned on when the sleeve 162 is moved to the rightward limit position viewing in FIG. 3. The engine coolant temperature sensor 306 generates an electric voltage signal representative of the engine coolant temperature. The brake sensor 307 detects whether or not the vehicle brake is actuated. The sensor output signals generated by the engine revolution speed sensor 301 and vehicle speed sensor 302 are sent to an input interface 311 after passage through wave shapers 308 and 309, respectively. The electric voltage from the throttle opening degree sensor 303 is converted by an analog-digital (A/D) converter 310 into a digital signal before being sent to the input interface 311. In addition to the input interface the shift control unit 300 comprises a reference pulse generator 312, a CPU (Central Processor Unit) 313, a ROM (Read Only Memory) 314, a RAM (Random Access Memory) 315, and an output interface 316, which are linked with each other by an address bus 319 and a data bus 320. The reference pulse generator 312 generates reference pulses with which the CPU 313 is actuated. The ROM 314 stores programs necessary for controlling the stepper motor 110 and lock-up solenoid 200 and data necessary for controlling them. The RAM stores various parameters necessary for processing information from each of the sensors and switches and parameters necessary for controlling the stepper motor 110 and lock-up solenoid 200. Output signals from the control unit 300 are sent to the stepper motor 110 and lock-up solenoid 200 via respective amplifiers 317 and 318.

Hereinafter, a concrete explanation is made regarding a control method carried out by this control unit 300 in controlling the stepper motor 110 and lock-up solenoid 200.

The control may be divided into two routines, one being a lock-up solenoid control routine 500, the other being a stepper motor control routine 700.

Figure 5:
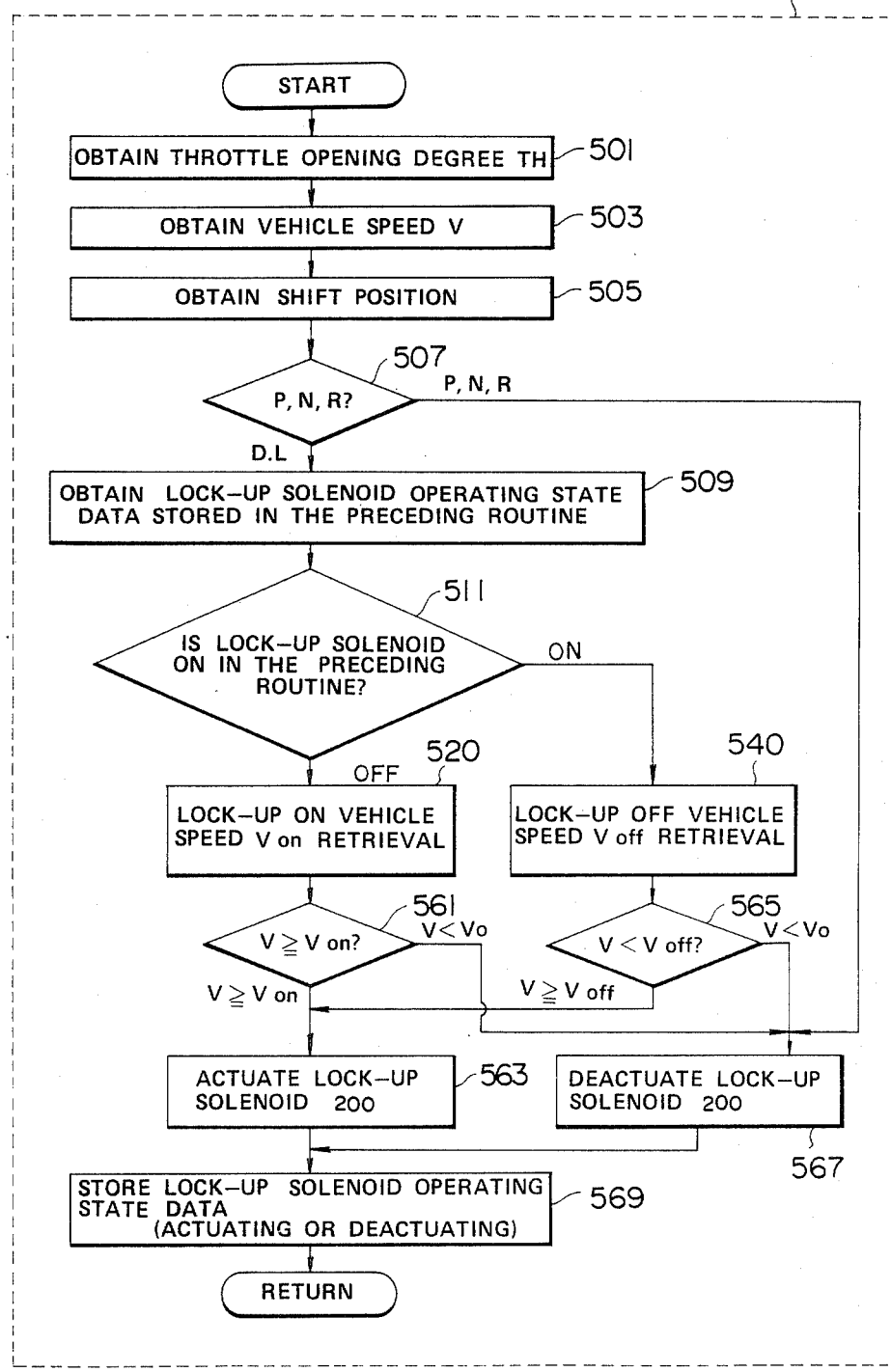
FIG. 5 is a flow chart of a lock-up solenoid control routine.
Figure 6:
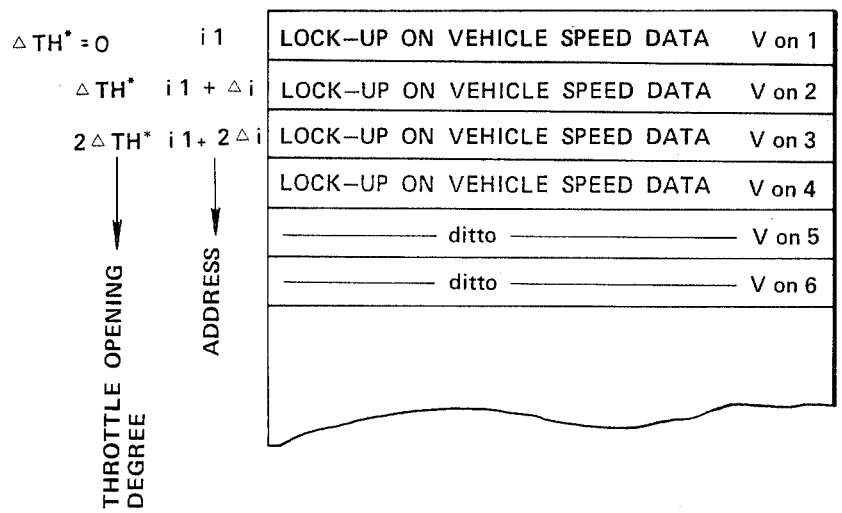
FIG. 6 is a diagrammatic view illustrating how lock-up on vehicle speed data are stored in a ROM 314 shown in FIG. 4.
Figure 7:
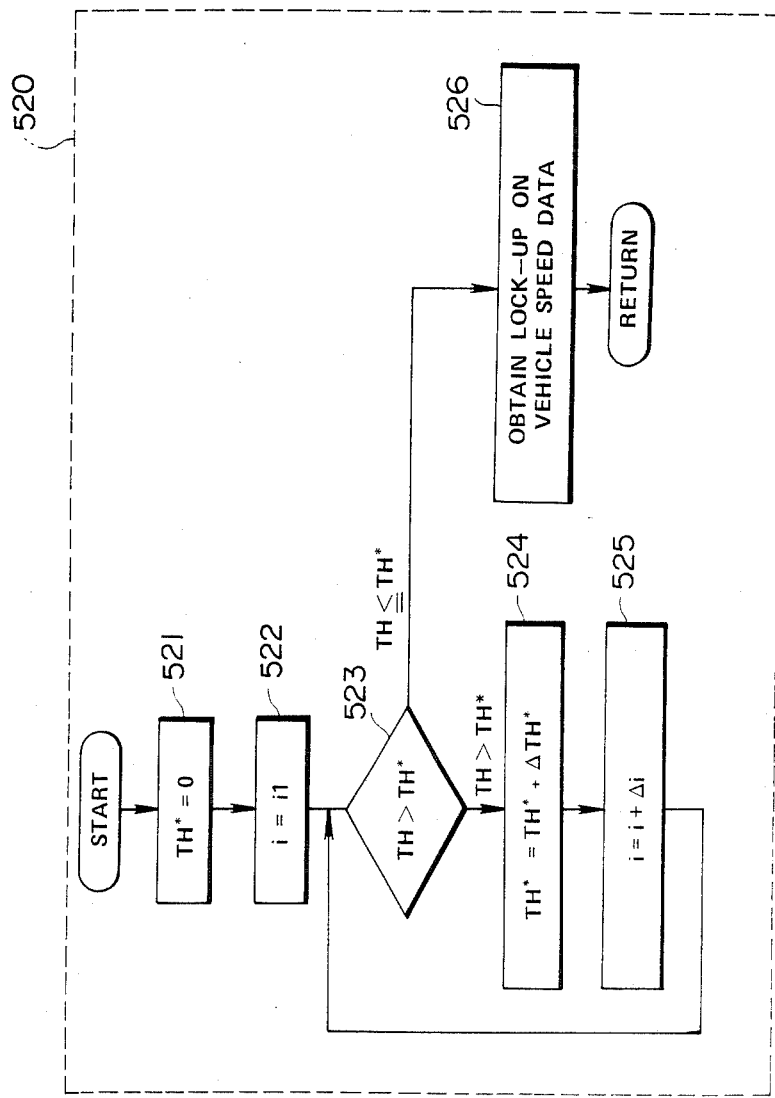
FIG. 7 is a flow chart showing a data retrieval routine for lock-up on vehicle speed data.

First of all, the control of the lock-up solenoid 200 is explained. The lock-up solenoid control routine 500 is shown in FIG. 5. The lock-up solenoid control routine 500 is executed once per a predetermined period of time. Thus, the execution of the following routine is repeated after a short period of time. A throttle opening degree signal TH indicative of the engine load is obtained from the throttle opening degree sensor 303 in step 501, then a vehicle speed indicative signal V is obtained from the vehicle speed sensor 302 in step 503 and after that a shift position indicative signal is obtained from the shift position switch 304 in step 505. A determination is made in step 507 whether or not any one of the P range, N range and R range is selected, and if the determination result reveals that the P range or N range or R range is selected, the lock-up solenoid 200 is deactuated (off state) in step 567 and then, in step 569, the present state of the lock-up solenoid 200 is stored in terms of a lock-up solenoid operating state data in the RAM 315 before the program returns to START of the routine 500. It will now be understood that as long as the P range or N range or R range is selected, the lock-up solenoid 200 is not energized and thus the torque converter 12 is in the non lock-up state. If the determination made in the step 507 shows that the D range or L range is selected, the lock-up solenoid operating state data stored in the preceding routine is obtained from the RAM 315 in step 509, and then a determination is made in step 511 whether or not the lock-up solenoid 200 was actuated or in the on state in the preceding routine. If in the preceding routine the lock-up solenoid 200 was not actuated or was in the off state, the data are retrieved in step 520 relating to a vehicle speed value (a lock-up on vehicle speed value Von) above which the lock-up solenoid 200 is to be actuated. The data retrieval routine 520 is described in connection with FIGS. 6, 7 and 8. Lock-up on vehicle speed data Von, such as, Von1-~Von6, are stored in the ROM 314 for the throttle opening degrees as shown in FIG. 6. Referring to FIG. 7, in the data retrieval routine 520, a reference throttle opening degree TH* is given a zero value in step 521 which corresponds to idle state and then an address i for the ROM 314 is given a number i1 corresponding to the number zero of the reference throttle opening degree TH* (in step 522). Then, the actual throttle opening degree TH is compared with the reference throttle opening degree TH* (in step 523). If the actual throttle opening degree TH is smaller than or equal to the reference throttle opening degree TH*, the number i1 gives an address in the ROM 314 where an optimum lock-up on vehicle speed data Von corresponding to the actual throttle opening degree TH is stored and the lock-up on vehicle speed data Von is obtained from the address given by the number i1 (in step 526). On the other hand, if the actual throttle opening degree TH is greater than the reference throttle opening degree TH* in the step 523, the reference throttle opening degree TH* is increased by a predetermined amount $\Delta TH^*$ (in step 524) and address i is increased by a predetermined amount $\Delta i$ (in step 525). Thereater, the program returns to the step 523 again where the actual throttle opening degree TH is compared with the reference throttle opening degree TH*. By repeating this chain of steps (steps 523, 524 and 525), the number of the address i in the ROM 314 is given where a look-up on vehicle speed data Von corresponding to the actual throttle opening degree TH is stored. Then, the lock-up on vehicle speed data Von is obtained from the address i.

Referring again to FIG. 5, after the completion of the data retrieval routine 520 the lock-up on vehicle speed data Von is compared with the actual vehicle speed V (in step 561) and if the actual vehicle speed V is higher than or equal to the lock-up on vehicle speed Von, then the lock-up solenoid 200 is actuated (in step 563), whereas if the relationship is reversed the lock-up solenoid 200 is not actuated (in step 567), and then operating state data indicating the actuated state or the deactuated state is stored in the RAM 315 (in step 569).

If, in the step 511, the lock-up solenoid 200 was found to be actuated in the preceding routine, a retrieval routine for vehicle speed data Voff (a lock-up off vehicle speed) below which the lock-up is to be released is executed (in step 540). This data retrieval routine 540 is substantially the same in operation as the data retrieval routine 520 for lock-up on vehicle speed data Von (the only difference being in the stored data as follows) and therefore the explanation thereof is omitted.

Figure 8:
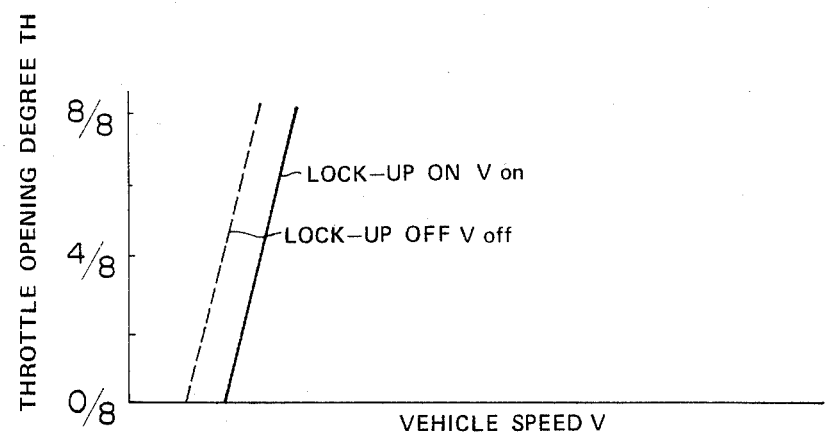
FIG. 8 is a graph showing a relationship between a lock-up on vehicle speed Von and a lock-up off vehicle speed Voff.

The lock-up on vehicle speed data Von and the lock-up off vehicle speed data Voff have the relationship as shown in FIG. 8. The relationship that Von is greater than Voff provides a hysteresis. This prevents the occurrence of hunting of the lock-up solenoid 200.

After the completion of the step 540, the lock-up off vehicle speed data Voff which has been retrieved in the step 540 is compared with the actual vehicle speed V in step 565, and if the vehicle speed V is higher than or equal to the lock-up off vehicle speed Voff, the lock-up solenoid 200 is actuated in step 563. If V is lower than Voff, the lock-up solenoid 200 is deactuated in step 567. Then the lock-up solenoid operating state indicative data is stored in the RAM 315 before the program returns to START.

Hereinafter, the stepper motor control routine 700 for the stepper motor 110 will be explained in connection with FIGS. 9(a), 9(b) and 9(c). The stepper motor control routine 700 is executed once per a predetermined period time. Thus, the execution of the following routine is repeated after a short period of time. First, the solenoid operating state data which was stored in the step 569 (see FIG. 5) of the lock-up solenoid control routine 500 is obtained in step 698 (see FIG. 9(a)), and a determination is made of the lock-up state in step 699. If the lock-up solenoid 200 was actuated, the execution of a routine beginning with a step 701 starts, whereas if the lock-up solenoid 200 was not actuated, the execution of a chain of steps beginning with step 713 (see FIG. 9(b)) starts. In the latter case the control is made, in a manner described later, such that the largest reduction ratio is maintained. That is, the largest reduction ratio is maintained during operation with the torque converter 12 in the non lock-up state.

Figure 22:
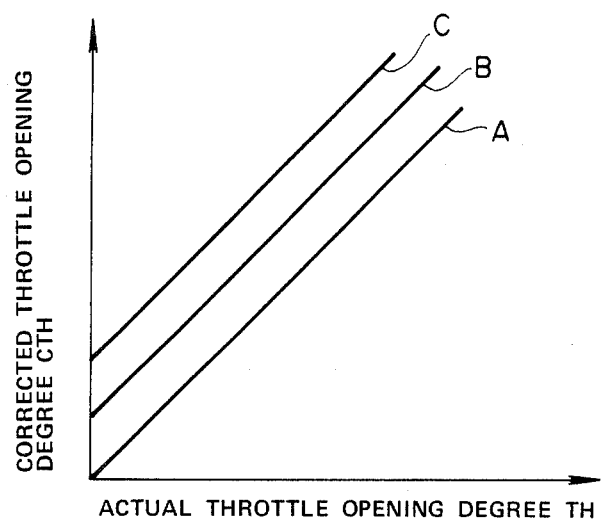
FIG. 22 is a graph showing a relationship between an actual throttle opening degree indicative signal TH and a corrected throttle opening degree indicative signal CTH.

If, in step 699, the lock-up solenoid 200 is actuated, the throttle opening degree TH is obtained from the throttle opening degree sensor 303 (in step 701), then the vehicle speed V is obtained from the vehicle speed sensor (in step 703), and then the shift position is obtained from the shift position switch 304 (in step 705). Next, an actual engine coolant temperature TW is obtained from the engine coolant temperature sensor 306 in step 802 shown in FIG. 9(c), then a determination is made (in step 803) whether the actual engine coolant temperature TW is less than a predetermined temperature valve TWo or not, and if the actual engine temperature TW is lower than the predetermined value TWo, the difference between the actual engine coolant temperature TW and the predetermined value TWo is multiplied with a predetermined coefficient k1 to give a throttle opening degree correction value CTW1 (in step 804), and, in the next step 805A, the throttle opening degree correction valve CTW1 is added to the throttle opening degree TH to give a corrected throttle opening degree CTH. If, in step 803, the actual engine coolant temperature TW is greater than or equal to the predetermined value TWo, the corrected throttle opening degree CTH is given the throttle opening degree TH (in step 806). The corrected throttle opening degree CTH and the throttle opening degree TH have a relationship as illustrated in FIG. 22. As shown by the line A, TH is equal to CTH if TW is greater than or equal to TWo, and if TW is less than TWo, the more the actual engine coolant temperature TW decreases, the more the corrected throttle opening degree CTH increases for the same throttle opening degree TH as shown by the line B and line C. For example, if the setting is such that TWo=60° C., the line A corresponds to temperature higher than 60° C., the line B corresponds to 35° C. and the line C to 10° C. Subsequently, a determination is made whether the present shift position lies in D range (in step 707) and if the present shift position lies in D range, a D range shift pattern data retrieval routine is executed (in step 720).

Figure 10:
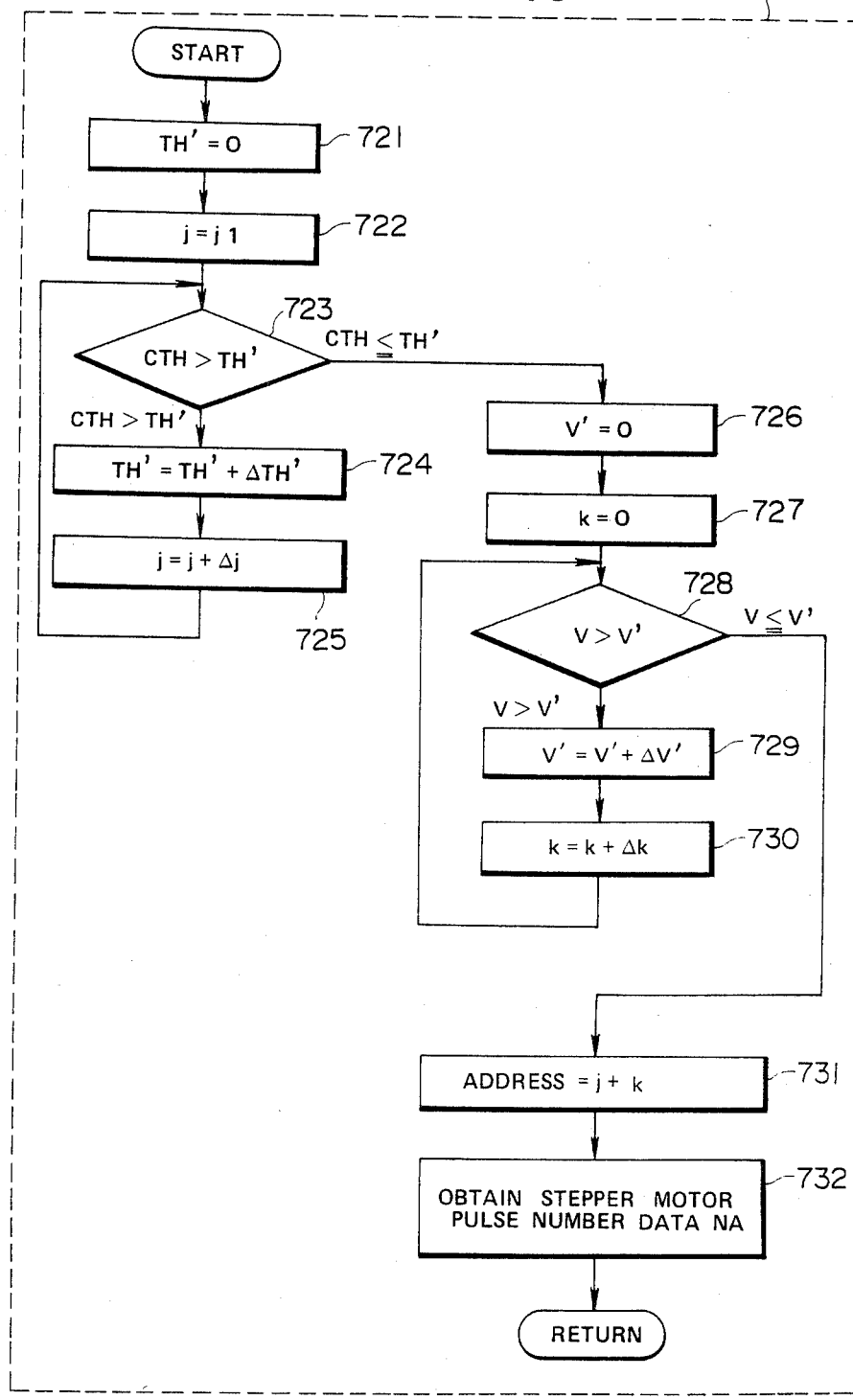
FIG. 10 is a flow chart showing a D range pattern data retrieval routine.

The D range shift pattern data retrieval routine is executed in a manner as illustrated in FIG. 10. Stepper motor pulse number data ND are stored in the ROM 314 in such a manner as shown in FIG. 11. Briefly explaining, the vehicle speeds are arranged along the lateral axis and the throttle opening degrees are arranged in the vertical axis (the vehicle speed increases toward the right viewing in FIG. 11 and the throttle opening degree increases toward the bottom viewing in FIG. 11). In the D range shift pattern data retrieval routine 720, a reference throttle opening degree TH' is given a zero value (idle state) (in step 721) and an address j of the ROM 314 where the pulse number data corresponding to the zero throttle opening degree is stored is given a number J1 (in step 722). Subsequently, the corrected throttle opening degree CTH is compared with the reference throttle opening degree TH' (in step 723) and if the corrected throttle opening degree CTH is greater than TH', the reference throttle opening degree TH' is increased by a predetermined value ΔTH' (in step 724) and the address j is increased by a predetermined value Δj (in step 725). After this step, the corrected throttle opening degree CTH is compared with the reference throttle opening degree TH' again (in step 723). If the corrected throttle opening degree CTH stays greater than TH', the step 723 is executed again after the execution of the before mentioned steps 724 and 725. After the execution of the chain of the steps (steps 723, 724 and 725) has been repeated, the number j corresponding to the corrected throttle opening degree CTH is given when the corrected throttle opening degree CTH becomes less than or equal to the reference throttle opening degree TH'. Subsequently, the similar processing (steps 726, 727, 728, 729 and 730) is carried out in relation to vehicle speed V. As a result, the number k is given which corresponds to the actual vehicle speed V. Then, the number k thus given is combined with the number j (in step 731), thus producing an address corresponding to a set of the corrected throttle opening degree CTH and the actual vehicle speed V, and the stepper motor pulse number data is obatined from this address (in step 732). The pulse number data ND thus obtained shows a desired number of pulses to be given for the corrected throttle opening degree CTH and the actual vehicle speed V. The D range shift pattern data retrieval routine 720 ends with the step of obtaining the pulse number data ND before the program returns to START.

Figure 9A:
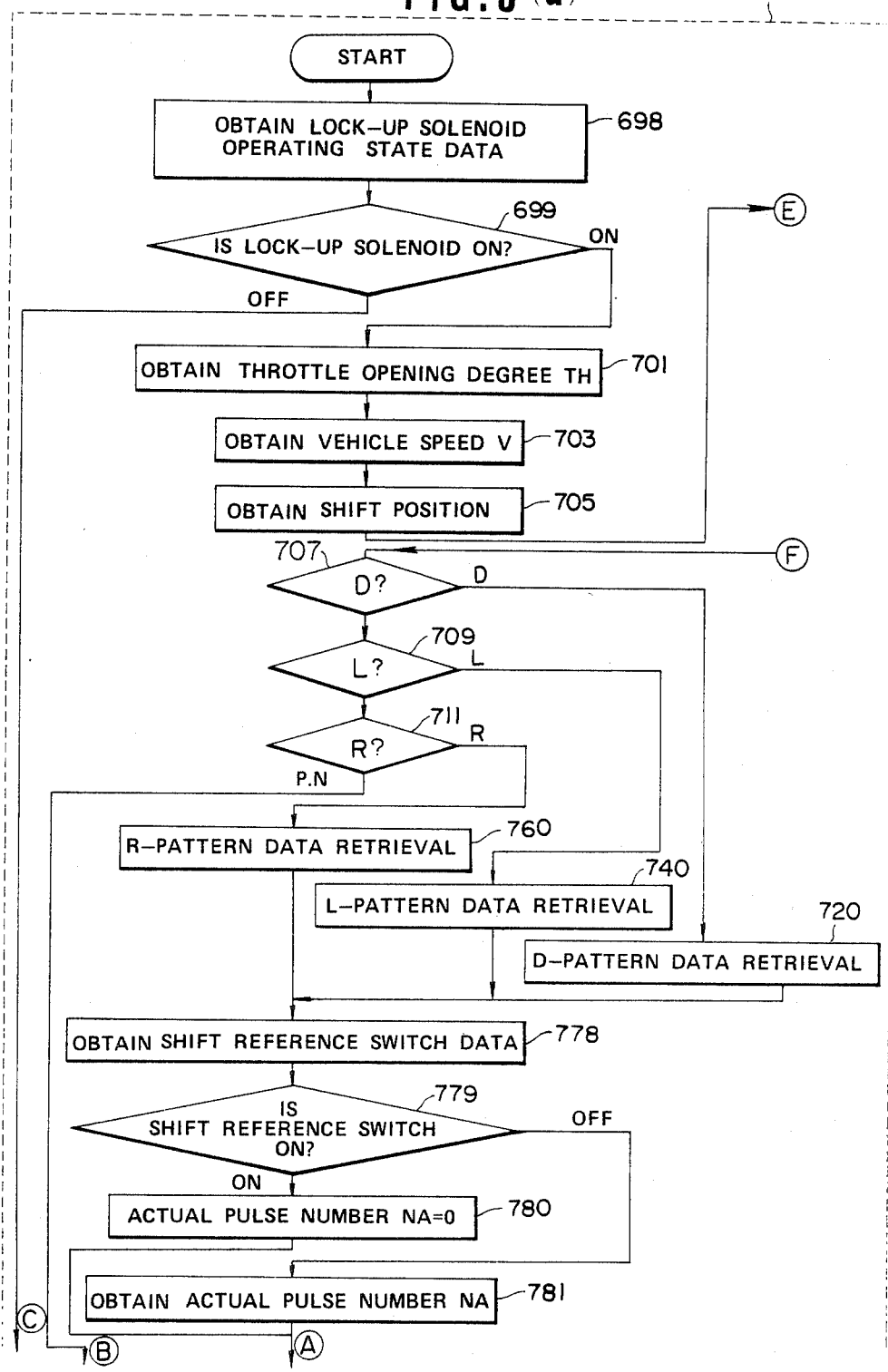
FIGS. 9(a), 9(b) and 9(c) illustrate a flow chart showing a stepper motor control routine.
Figure 9:
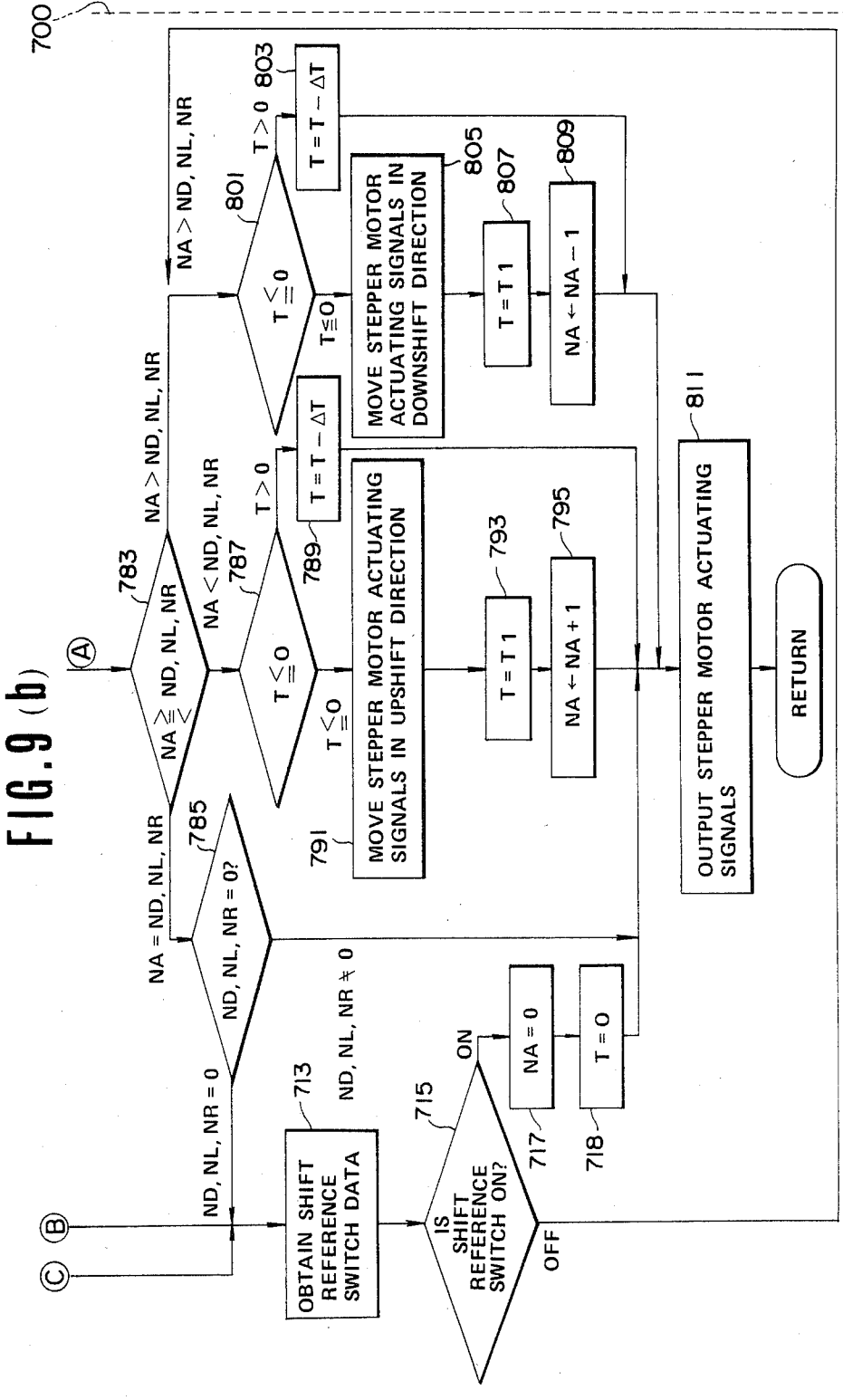

Referring to FIG. 9(a), if the D range is not selected as the result of the determination in the step 707, then a determination is made whether or not the L range is selected in step 709, and if the L range is selected, a L range shift pattern data retrieval routine is executed (in step 740). The L range shift pattern data retrieval routine is substantially similar to the D range shift pattern data retrieval routine 720 except that the stepper motor pulse number data NL are different from the stepper motor pulse number data ND (the difference between the pulse number data ND and NL will be described hereinafter) and are stored at different addresses in the ROM 314. A detailed explanation thereof is, therefore, omitted.

If neither the D range nor the L range is selected, a determination is made whether or not the R range is selected in step 711. If the R range is selected, a R range shift pattern data retrieval routine 760 is executed in step 760. The R range shift pattern data retrieval routine 760 is substantially similar to the D range shift pattern data retrieval routine 720 except that different stepper motor pulse number data NR are stored and thus a detailed explanation thereof is omitted.

After the data retrieval of the suitable pulse number data ND, NL or NR in the respective step 720, 740 or 760, a shift reference switch data is obtained from the shift reference switch 240 in step 778 and then a determination is made whether the shift reference switch 240 is in the on-state or the off-state in step 779. The shift reference switch data indicates whether the shift reference switch 240 is turned on or off. If the shift reference switch 240 is in the off state, the actual stepper motor pulse number data NA is retrieved from the RAM 315 in step 781. This pulse number data NA corresponds one to one to the actual rotary position of the stepper motor 110 unless there is any electric noise. If, in the step 779, the shift reference switch 240 is in on state, the pulse number data NA is given a zero value in step 780. The shift reference switch 240 is so designed as to be turned on when the sleeve 162 assumes a position corresponding to the largest reduction ratio. This results in the rotary position of the stepper motor 110 always corresponding to the largest reduction ratio position whenever the shift reference switch 240 is turned on. Because the actual pulse number data NA is given a zero value whenever the shift reference switch 240 is turned on, the pulse number data NA can correspond accurately to the actual rotary position of the stepper motor 110 should there occur signal distortion due to electric noise. Consequently, the signal distortion due to the accumulation of noise is eliminated. Subsequently, in step 783 (see FIG. 9(b)), the actual pulse number data NA is compared with the retrieved desired pulse number data ND, NL or NR.

Referring to FIG. 9(b), if the actual pulse number data NA is equal to the desired pulse number data ND, NL or NR as the result of step 783, a determination is made whether or not the desired pulse number ND, NL or NR is zero in step 785. In the case the desired pulse number ND, NL or NR is not zero when the reduction ratio is not the largest, the same stepper motor actuating signals (described hereinafter) as provided for in the preceding routine are sent out in step 811 before the program returns to START. If the desired pulse number ND, NL or NR is zero in the step 785, the shift reference switch data is obtained from the shift reference switch 240 in step 713, and a determination is made whether the shift reference switch 240 is in the on state or the off state in step 715. If the shift reference switch 240 is in the on state, the actual pulse number data NA is given a zero value in step 717, a stepper motor timer value T which will be described later is given zero in step 718, and then the same stepper motor actuating signals as those of the preceding routine which correspond to the zero pulse number are sent out in step 811. If, in step 715, the shift reference switch 240 is in the off state, the execution of the steps following the step 801, which will be described later, begins.

If, in the step 783, the actual pulse number NA is smaller than the desired pulse number ND, NL or NR, the stepper motor 110 needs to be actuated toward a position where the pulse number increases. First, a determination is made or not the timer value T is negative or zero in step 787. If the timer value T is positive, then the timer value T is decreased by a predetermined value ΔT in step 789, and then the same stepper motor actuating signals as those of the preceding routine are sent out in step 811 before the program returns to START. This step 789 is repeated until the timer value T becomes zero or negative. When the timer value T becomes zero or negative after elapse of a predetermined period of time, then the stepper motor actuating signals for the stepper motor 110 are moved in the upshift direction by one stage in step 791 as described later. Then, the timer value T is given a predetermined positive value T1 in step 793; the stepper motor pulse number NA is increased by 1 in step 795, and the stepper motor actuating signals which have been moved by one stage in the upshift direction are sent out in step 811 before the program returns to START. This causes the stepper motor 110 to rotate toward the upshift direction by one unit.

If, in step 783, the present stepper motor pulse number NA is larger than the desired pulse number ND, NL or NR, a determination is made whether or not the timer value T is zero or negative in step 801. If the timer value T is positive, the timer value T is decreased by the predetermined value ΔT (in step 803), and the same stepper motor actuating signals as those of the preceding routine are sent out in step 811 before the program returns to START. After repeating this sequence of operations, the timer value T becomes zero or negative after elapse of a predetermined period of time because the decrement of the timer T by the predetermined value ΔT is repeated. When the timer value T becomes zero or negative, the stepper motor actuating signals are moved toward a downshift direction by one stage in step 805. Then the timer value T is given the predetermined positive value T1 in step 807; the stepper motor pulse number data NA is decreased by 1 in step 809, and the stepper motor actuating signals having been moved in the downshift direction are sent out (in step 811) before the program returns to START. This causes the stepper motor 110 to rotate in the downshift direction by one unit.

Figure 13:
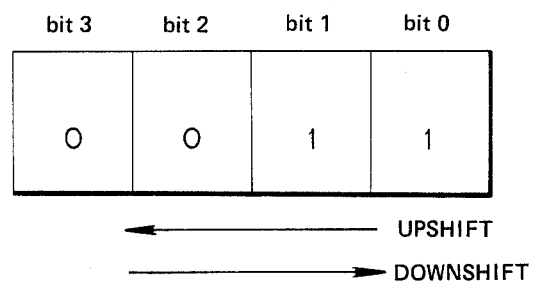
FIG. 13 is a diagrammatic view of the content of four bit positions corresponding to the mode A.
Figure 14:
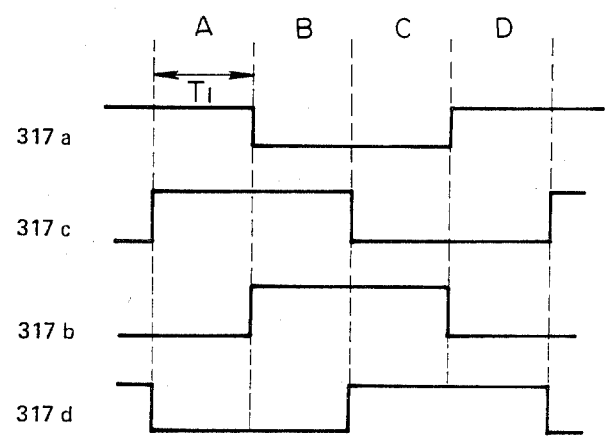
FIG. 14 is a timing diagram of the stepper motor actuating signals.

Referring to FIGS. 12 to 14 and particularly to FIGS. 13 and 14, the stepper motor actuating signals will now be described. The stepper motor 110 is connected with four output lead lines 317a, 317b, 317c, and 317d (see FIG. 4) having thereon respective signals which may vary in four modes A~D, and the stepper motor 110 rotates in the upshift direction (the direction denoted by an arrow X as shown in FIGS. 3 and 4) if the actuating signals are moved in the sequence of A→B→C→D→A, and the stepper motor 110 rotates in the reverse or downshift direction if the actuating signals are moved in the sequence of D→C→B→A→D. Referring to FIG. 13 which illustrates the content of the bits corresponding to the mode A of the actuating signals, the digit "1" is written in bit position 0, the digital "1" in bit position 1, the digit "0" in bit position 2, and the digit "0" in bit position 3. The bit positions 0, 1, 2, 3 correspond to the signals to be applied to the respective leads 317a, 317c, 317b and 317d. If the digit is "1" in a particular bit position, a signal voltage having a high level is applied to the lead operatively associated with the particular bit position. If the digit in a particular bit position is "0", a signal voltage having a low level is applied to the corresponding lead. Consequently, when the stepper motor 110 is to be rotated in the upshift direction, the bits are rotated to the right, i.e., the digits are moved one place to the left. When the stepper motor 110 is to be rotated one step in the downshift direction, the bits are rotated to the left, i.e., the digits are moved one place to the right.

The variation of the signals on the output lead lines 317a, 317c, 317b, and 317d upon upshifting is illustrated in FIG. 14. In FIG. 14, the period of time during which each of modes A, B, C and D stays constant, agrees with the timer value T1 which has been obtained in the step 793 or 807.

As described above, the stepper motor actuating signals are moved to the left or in the upshift direction in step 791 when the actual pulse number, i.e., the actual reduction ratio, is smaller than the desired pulse number, i.e., the desired optimum reduction ratio, thus serving as actuating signals for rotating the stepper motor 110 in the upshift direction. In the reverse case, when the actual reduction ratio is larger than the desired optimum reduction ratio, the stepper motor actuating signals are moved to the right or in the downshift direction in step 805, thus serving as actuating signals for rotating the stepper motor 110 in the downshift direction. When the actual reduction ratio agrees with the desired optimum reduction ratio, the actuating signals are not moved to the left nor right, and the same actuating signals as those of the preceding routine are sent out. In this case, the stepper motor 110 will not rotate, thus maintaining the reduction ratio constant.

If, in the previously described step 711 shown in FIG. 9(a), the R range is not selected, i.e., if the P range or N range is selected, the execution of the step 713 and its following steps begins. The shift reference switch data is obtained from the shift reference switch 240 in step 713 and if the shift reference switch 240 is in the on state, the actual pulse number NA is given a zero value in step 717 and the stepper motor timer value T is given a zero value in step 718. Then, the same actuating signals as those of the preceding routine are sent out in step 811 before the program returns to START. If the shift reference switch 240 is in the off state, the steps following the step 801 are executed which have been described. That is, the stepper motor 110 is rotated in the downshift direction. Accordingly, the largest reduction ratio is maintained when the shift position is in the P or N range.

Hereinafter, a description is made as to how the desired optimum reduction ratio is determined.

Referring to FIGS. 15-19, a description will now be given of how the desired optimum reduction ratio is determined to satisfy the minimum fuel consumption rate curve during operation in the D range.

Figure 15:
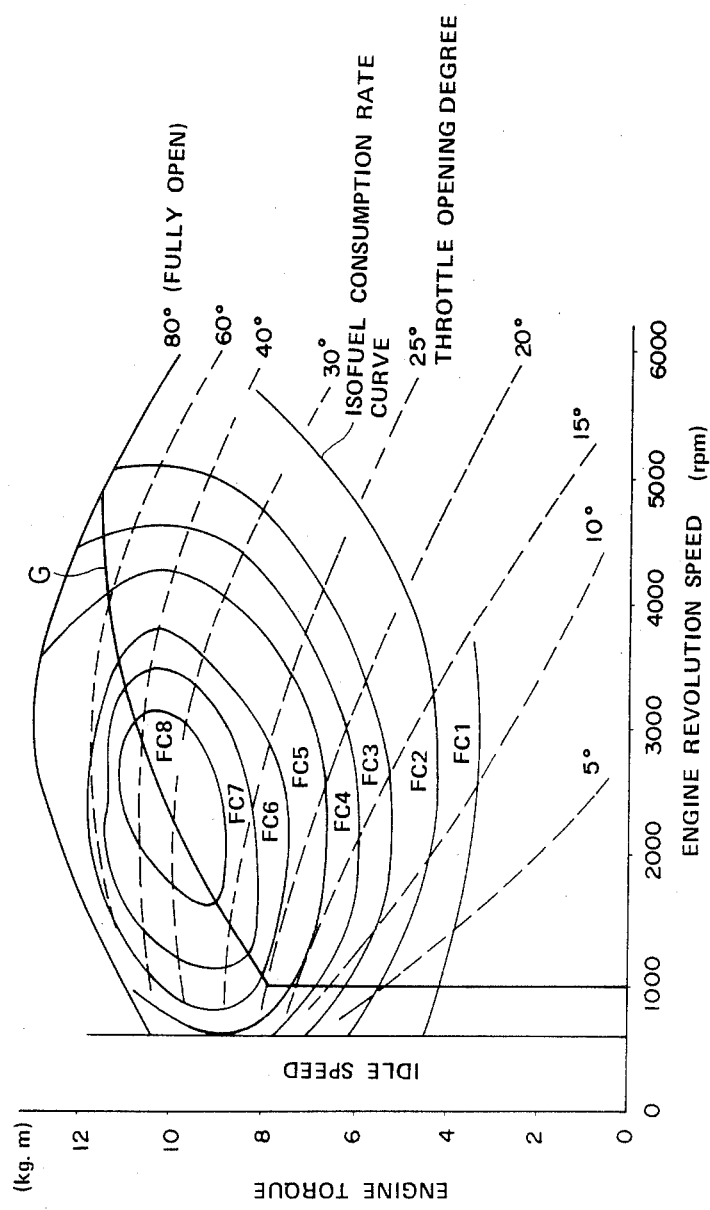
FIG. 15 is a graph showing a minimum fuel consumption rate curve G.
Figure 16:
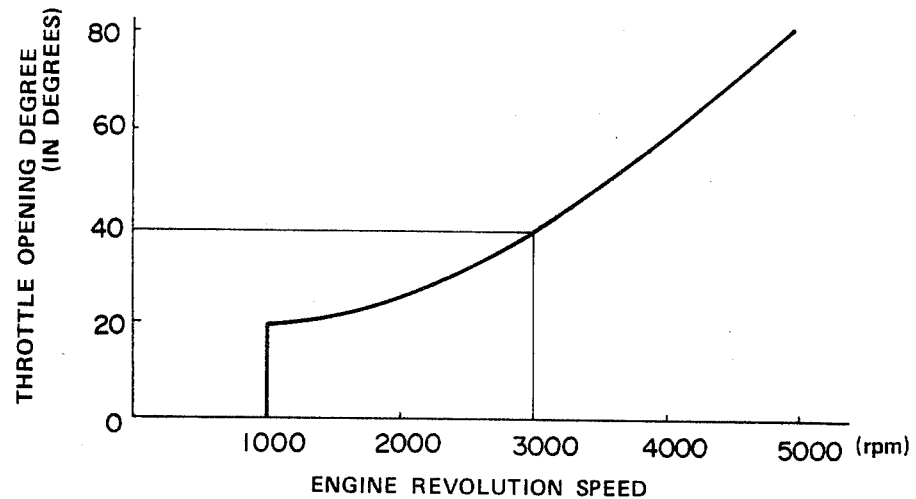
FIG. 16 is a graph showing the minimum fuel consumption rate curve expressed in terms of the throttle opening degree and engine revolution speed.
Figure 17:
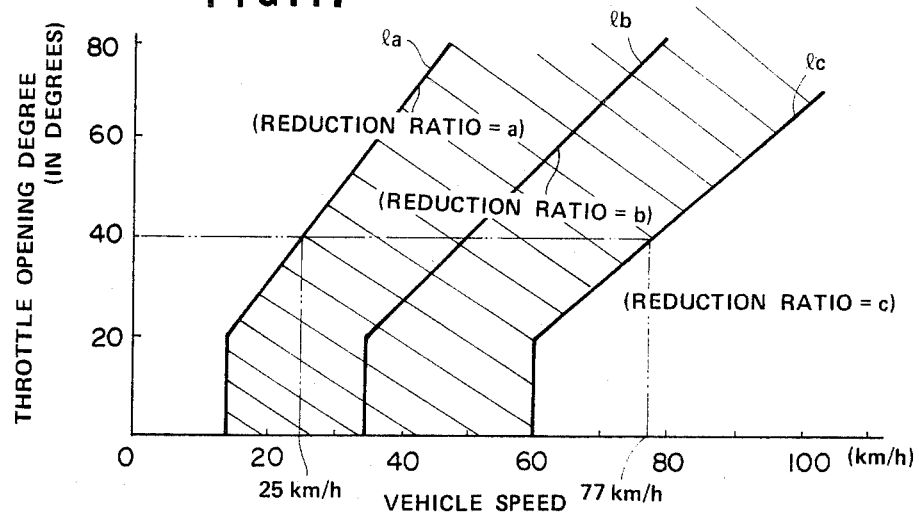
FIG. 17 is a graph showing the relationship shown in FIG. 16 expressed in terms of the throttle opening degree and vehicle speed for various reduction ratios.
Figure 18:
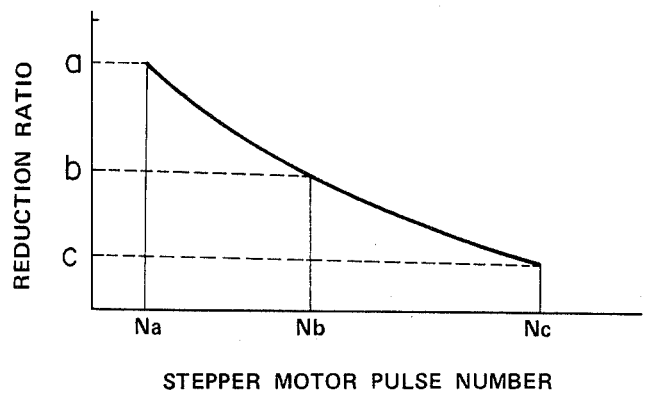
FIG. 18 is a graph showing a predetermined relationship of the reduction ratio with the stepper motor pulse number.
Figure 19:
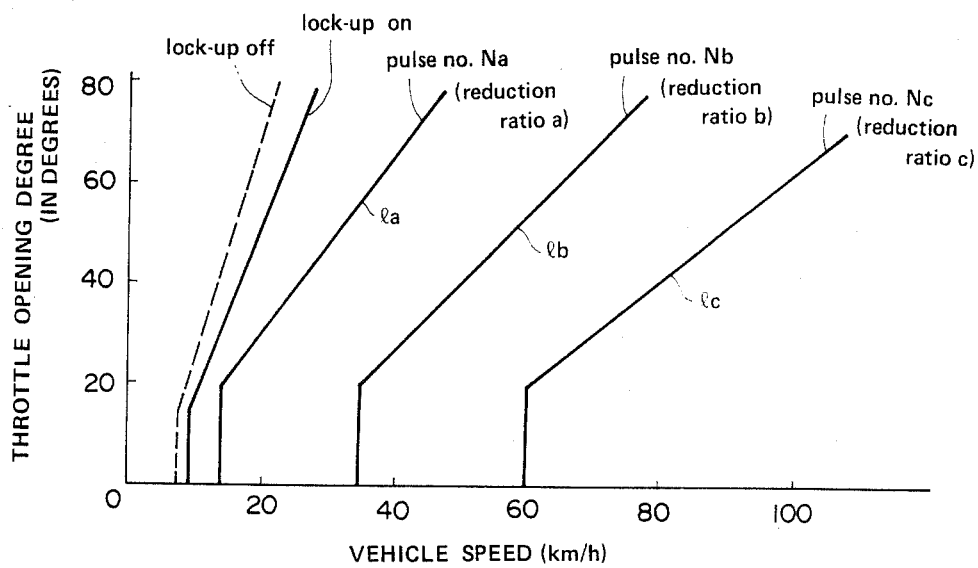
FIG. 19 is a graph showing a predetermined relationship shown in FIG. 16 expressed in terms of the throttle opening degree and vehicle speed for various pulse numbers.

Referring to FIG. 15, the engine performance curve is shown. In FIG. 15, engine revolution speed is expressed on the abscissa axis and engine torque on the ordinate axis and there are shown engine torque vs., engine revolution speed characteristic curves, each for a throttle opening degree (each curve being accompanied by a throttle opening degree) and there are also shown isofuel consumption rate curves FC1~FC8 (fuel consumption rate reducing in this numerical order). In FIG. 15, the minimum fuel consumption rate curve is denoted by the character G and the most efficient operational state is obtained if the engine is operated on this curve G. In order to control the continuously variable transmission so as to operate the engine along the minimum fuel consumption rate curve G, the pulse number data ND for the stepper motor 110 are determined in the following manner. If the minimum fuel consumption rate curve G is expressed in terms of throttle opening degree and engine revolution speed, the result may be expressed in FIG. 16. As will be understood, a single engine revolution speed is given for any throttle opening degree. For example, the engine revolution speed 3000 rpm is given for the throttle opening degree 40°. As shown in FIG. 16, the minimum engine revolution speed 1000 rpm is given for low throttle opening degrees (smaller than about 20 degrees) since the drive system of the continuously variable transmission would exhibit resonance with the engine vibration if the lock-up clutch is engaged with the engine revolution speeds below this minimum engine revolution speed. The engine revolution speed is N and vehicle speed V, then the reduction ratio S is given by the equation:

$$S = (N/V) \cdot k$$

where, k denotes a constant determined by the final reduction ratio and the radius of the tire. It will now be understood from the above equation and FIG. 16 that the desired optimum reduction ratio is determined by the vehicle speed V and the target engine revolution speed N which satisfies a predetermined relationship with the throttle opening degrees, i.e., engine load, as shown in FIG. 16. If the relationship shown in FIG. 16 is expressed in terms of vehicle speed rather than the engine revolution speed, the result may be expressed as shown in FIG. 17. Even with the same engine revolution speed, the vehicle speed differs from reduction ratio to reduction ratio and this fact is expressed in terms of a range of vehicle speed as shown in FIG. 17. Line la denotes the variation upon selecting the largest reduction ratio (reduction ratio a), and line lc denotes the variation upon selecting the smallest reduction ratio (reduction ratio c), where line lb denotes the variation upon selecting an intermediate reduction ratio b. For example, the vehicle can run at vehicle speeds from 25 km/h to 77 km/h with the throttle opening degree 40 while the reduction ratio decreases. The reduction ratio remains at a below 25 km/h and at c above 77 km/h with the throttle opening degree 40. A predetermined relationship exists between the position of the sleeve 162 of the shift operating mechanism 112 and a reduction ratio. This means that a predetermined relationship exists between the stepper motor pulse number applied to the stepper motor 110 (i.e., rotary position of the stepper motor 110) and the reduction ratio as shown in FIG. 18. Thus, the reduction ratios (a or b or c) shown in FIG. 17) can be converted into respective pulse numbers using the graph shown in FIG. 18. The result of this conversion is illustrated in FIG. 19. Also shown in FIG. 19 are the lock-up on and lock-up off vehicle speed lines shown in FIG. 8 from which it will be understood that the lock-up on and lock-up off vehicle speed lines are disposed on the lower vehicle speed side of the line la with the largest reduction ratio a.

Control of the continuously variable transmission with the shift pattern illustrated in FIG. 19 is as follows. Upon moving off from a standstill, the continuously variable transmission is maintained at the largest reduction ratio and the torque converter 12 is held in the non lock-up state. Therefore, a traction force strong enough for moving the vehicle off from standstill is given. When the vehicle speed exceeds the lock-up on line, the lock-up clutch 10 of the torque converter 12 (see FIG. 1) engages, thus putting the torque converter 12 in the lock-up state. When the vehicle speed exceeds the line a as a result of an increase in the vehicle speed, the reduction ratio continuously varies between the reduction ratio and the reduction ratio c in such a manner as to satisfy the relationship denoted by the minimum fuel consumption rate curve G shown in FIG. 15. For example, if the throttle opening degree is increased from a state where the vehicle is running at a constant vehicle speed with a constant throttle opening degree in an operating range falling between lines la and lc, the desired engine revolution speed changes and the desired pulse number changes with the change in the desired revolution speed as determined by the relationship illustrated in FIG. 16. The stepper motor 110 rotates to a new rotary position in response to the new desired stepper motor pulse number, establishing a new reduction ratio, thus allowing the actual engine revolution speed to agree with the new target engine revolution speed. The engine is controlled to operate along with the minimum fuel consumption rate curve G of the engine since, as described before, the stepper motor pulse number is determined to satisfy the minimum fuel consumption rate curve G of the engine. In this manner, the reduction ratio is controlled by controlling the stepper motor pulse number since each reduction ratio corresponds uniquely to a single stepper motor pulse number.

The above description has been directed to the operating condition when the engine coolant temperature TW is greater than or equal to the predetermined value TWo wherein the throttle opening degree TH is equal to the corrected throttle opening degree CTH. If TW is less than TWo, the actual throttle opening degree TH is smaller than the corrected throttle opening degree CTH, and the shift pattern retrieval is effected based on the corrected throttle opening degree CTH rather than the actual throttle opening degree TH. Since each of the shift patterns for the respective D range, L range and R range provides a larger reduction ratio for the same vehicle speed as the throttle opening degree increases, a relatively large reduction ratio is given when the engine coolant temperature is low. This results in an increase in the engine revolution speed, thus eliminating engine vibrations and the power shortage which otherwise would take place when the engine operates irregularly upon start-up of the cold engine.

Although in the above described embodiment, the correction is effected to give the corrected throttle opening signal CTH which is in a first-order proportion to the difference between the engine coolant temperature signal TW and the predetermined temperature value signal TWo, it is also allowed to effect the correction so that the corrected throttle opening degree signal is in a second-order function or another function of the difference. It is also allowed to correct the throttle opening degree signal TH by a predetermined value to give the corrected throttle opening signal CTH when the engine coolant temperature signal TW is less than the predetermined temperature value signal TWo.

In the embodiment described above, the control is based on the engine throttle opening degree, but it is apparently possible to carry out a similar control based on the intake manifold vacuum or the fuel flow rate. FIGS. 20 and 21 illustrate the minimum fuel consumption rate curves G for the latter two cases, respectively.

The above description has been directed to the shift pattern to be selected upon selecting D range, but all that is necessary for operation in L or R range is to give data relating to different shift patterns from that in D range. For example, for the same throttle opening degree a shift pattern for L range provides a large reduction ratio as compared to the reduction ratio which is given by the shift pattern for D range for the purpose of enhancing acceleration performance and ensuring adequate engine braking performance at zero throttle opening degree. In a shift pattern for L range, a reduction ratio larger than the reduction ratio given by the shift pattern for L range is given for the same throttle opening degree. These shift patterns can be accomplished simply by inputting of predetermined pulse data. A more detailed explanation of the operation in the L and R ranges is omitted since basic actions carried out to effect the control are the same as in the D range.

Next, brief explanation is made as to the brake sensor 307 shown in FIG. 4.

The engine brake sensor 307 is turned on when the foot brake is actuated and used for the following control. The control is such that if the brake sensor 307 is in on state and at the same time the throttle opening degree is zero, the shift pattern for the D range is switched to a shift pattern providing larger reduction ratios. This ensures strong engine braking upon depressing the brake during operation in D range.

Hereinafter, the second embodiment is described in connection with FIG. 23 and FIGS. 9(a) and 9(b) as well.

Figure 9C:
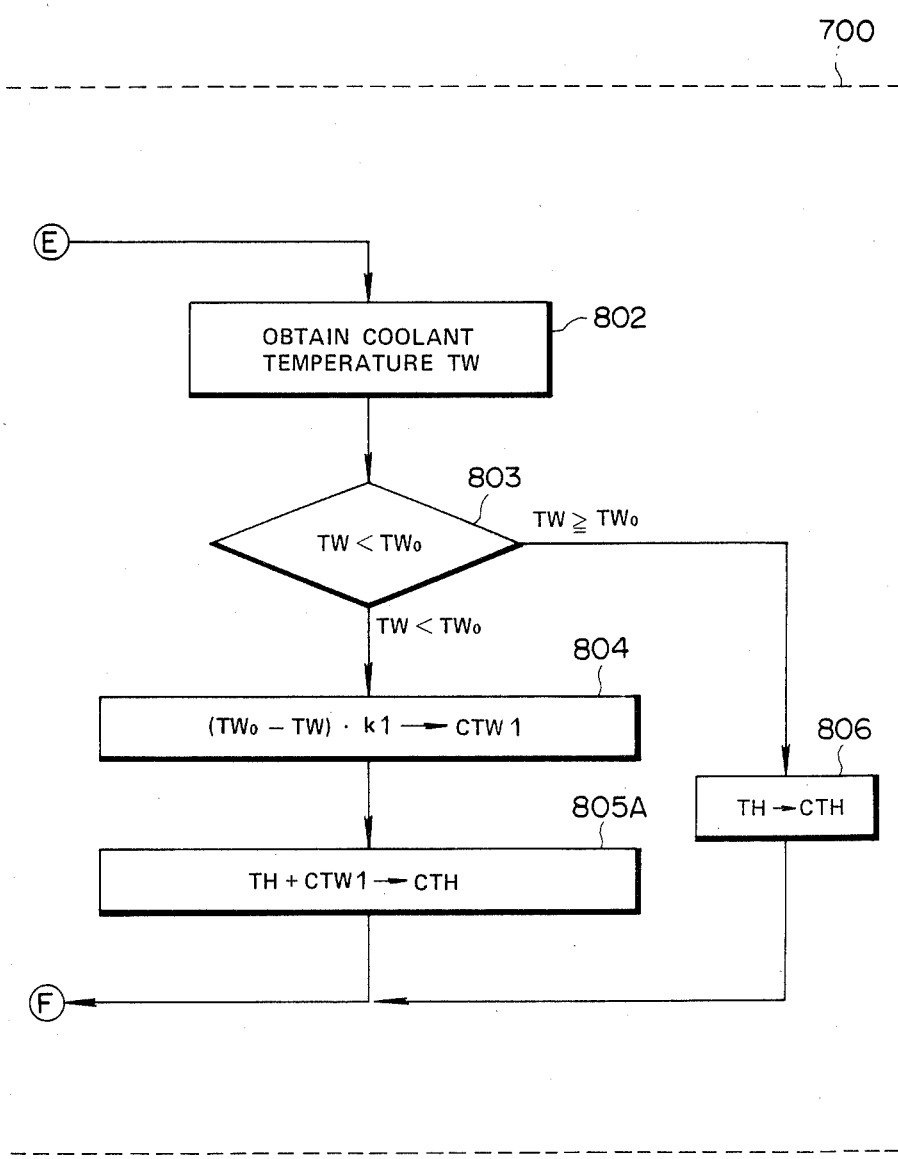
Figure 23:
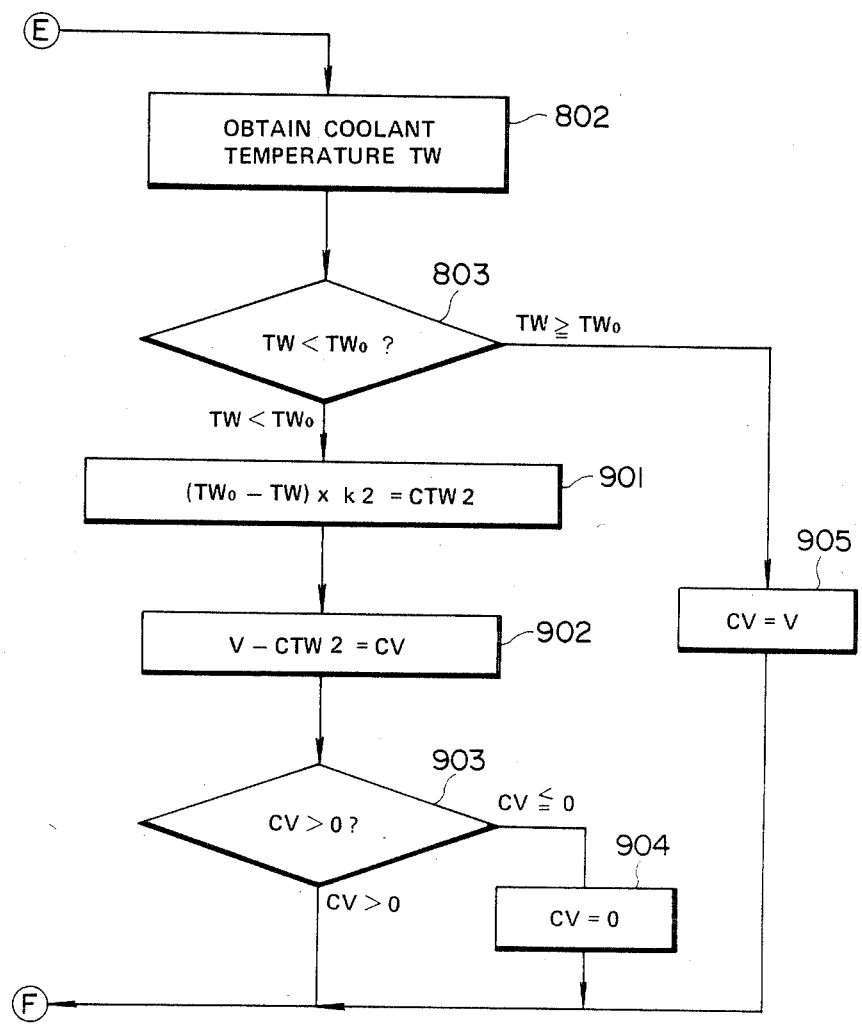
FIG. 23 is a similar view to FIG. 9(c) showing a portion of a flow chart of a stepper motor control routine of a second embodiment according to the present invention.

This embodiment results from replacing the steps 802 to 805A shown in FIG. 9(c) with the steps shown in FIG. 23 and provides the similar operation and effect to those provided by the first embodiment by correcting the vehicle speed signal V.

Figure 24:
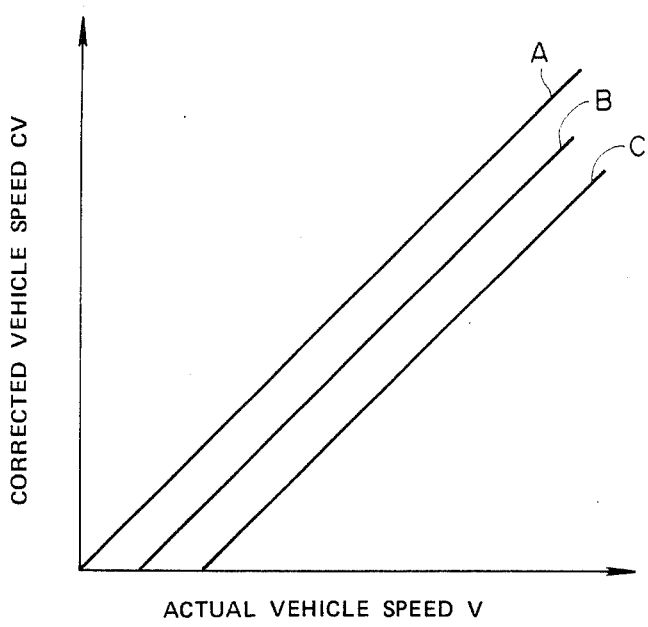
FIG. 24 is a graph showing a relationship between an actual vehicle speed indicative signal V and a corrected vehicle speed indicative signal CV.

After the completion of step 705 shown in FIG. 9(a), an actual engine coolant temperature TW is obtained from the engine coolant temperature sensor 306 in step 802 shown in FIG. 23, then a determination is made whether or not the actual coolant temperature TW is less than a predetermined temperature valve TWo in step 803, and if the actual coolant temperature TW is less than the predetermined value TWo, a difference between the predetermined value TWo and the actual coolant temperature TW is multiplied with a predetermined coefficient k2 to give a vehicle speed correction value CTW2 (in step 901), and in the next step 902 the vehicle speed correction value CTW2 is subtracted from the vehicle speed V to give the corrected vehicle speed CV. For preventing the corrected vehicle speed CV from taking a negative value, a determination is made whether the corrected vehicle speed CV is positive or not (in step 903) and if the corrected vehicle speed CV turned out to be negative, the corrected vehicle speed CV is given a zero value (in step 904). If, in step 803, the actual coolant temperature TW is greater than or equal to the predetermined value TWo, the corrected vehicle speed CV is given the actual vehicle speed V (in step 905). The corrected vehicle speed CV thus given and the actual vehicle speed V have a relationship as shown in FIG. 24. That is, V is equal to CV if TW is greater than or equal to TWo as illustrated by the line A, and if TW is less than TWo, the more the actual coolant temperature TW decreases, the more the corrected vehicle speed CV decreases for the same vehicle speed V as shown by line B and line C. If the setting is such that TWo=60° C., the line A corresponds to temperatures above 60° C., the line B corresponds to 35° C., and the line C corresponds to 10° C.

Upon completion of these processing, the execution of step 707 and the following steps is initiated.

Since each of the shift patterns for the respective ranges provides a larger reduction ratio as the vehicle speed decreases for the same throttle opening degree, the retrieval which is carried out based on the vehicle speed which has been corrected to have a smaller value when the engine coolant temperature is low, provides a relatively large reduction ratio as compared to the ordinary case.

Although, in the above embodiment, the correction is effected such that the corrected vehicle speed signal CV is in a first-order proportion to the difference between the engine coolant temperature signal TW and the predetermined temperature value signal TWo, it is allowed to effect the correction such that the corrected vehicle speed signal CV is in a second-order function or another function of the difference. It is also allowed to correct the vehicle speed signal V by a predetermined value to give the corrected vehicle speed signal CV when the engine coolant temperature signal TW is less than the predetermined temperature value signal TWo.

Hereinafter, the third embodiment is described in connection with FIG. 25 and FIGS. 9(a) and 9(b) as well.

Figure 25:
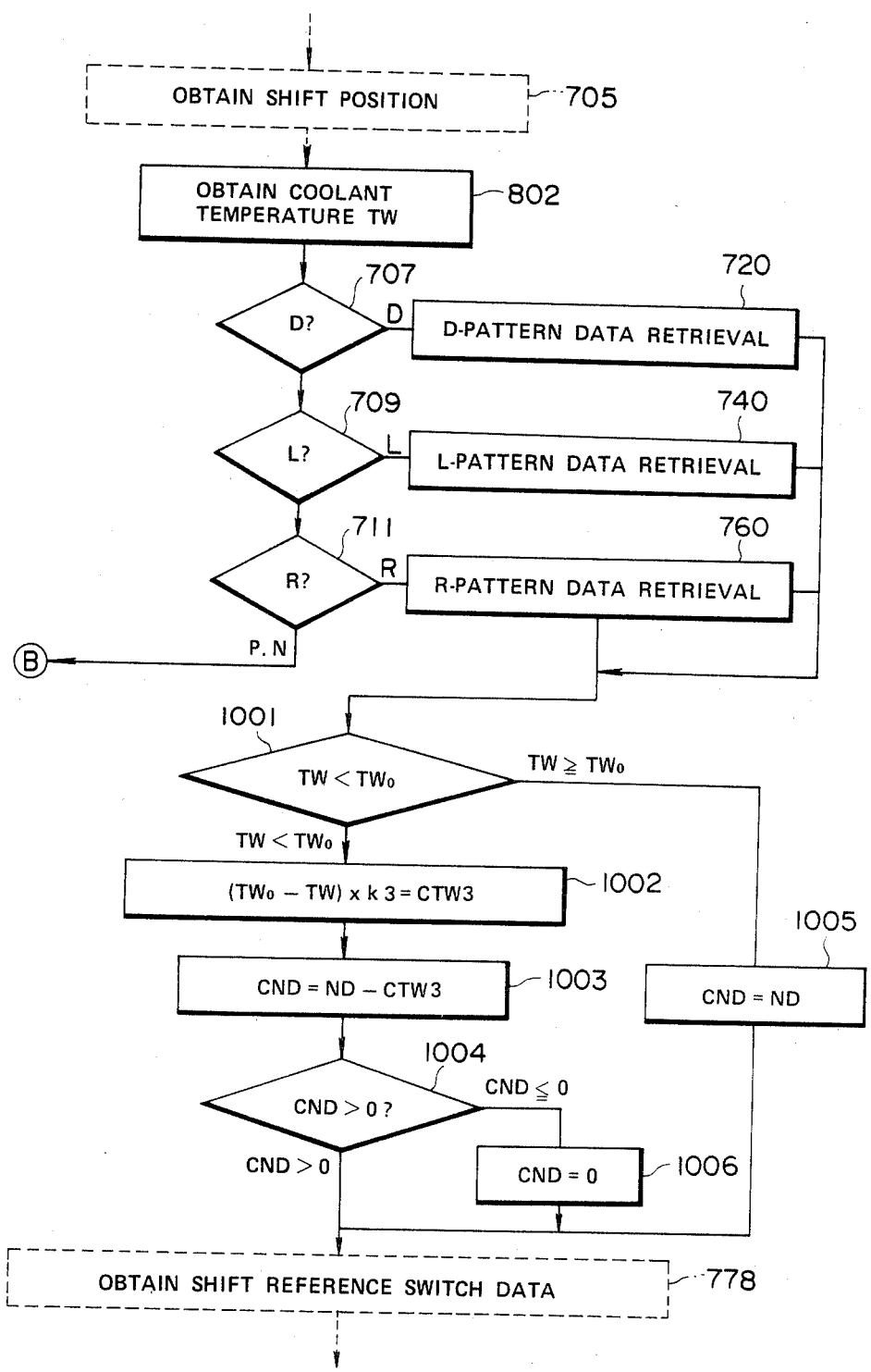
FIG. 25 is a view showing a portion of a flow chart of a stepper motor control routine of a third embodiment according to the present invention.

This embodiment results from replacing the steps 705 to 778 shown in FIGS. 9(a) and 9(c) with steps as shown by the solid lines in FIG. 25 and provides the similar operation and effect to those given by the first embodiment by directly correcting the stepper motor pulse number signal.

Figure 26:
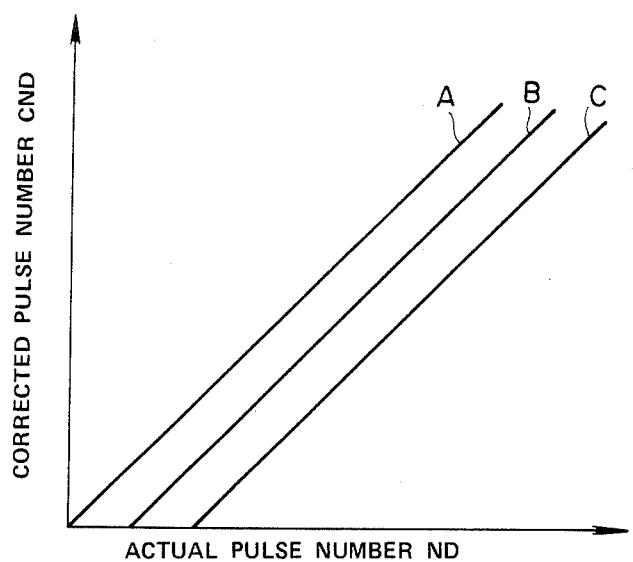
FIG. 26 is a graph showing a relationship between an actual pulse number indicative signal ND and a corrected pulse number indicative signal ND.

After the completion of the step 705, an actual engine coolant temperature TW is obtained from an engine coolant temperature sensor 306 in step 802 shown in FIG. 25, and then one of D, L and R range pattern data retrievals is carried out which corresponds to that one of D, L and R ranges which has been selected (in step 707, step 709, step 711, step 720, step 740 and step 760). Subsequently, a determination is made whether the actual coolant temperature TW is less than the predetermined value TWo (in step 1001), and if the actual coolant temperature TW is less than the predetermined value TWo, the difference between the predetermined value TWo and the actual coolant temperature TW is multiplied with a predetermined coefficient k3 to give a pulse number correction factor CTW3 (in step 1002); and a corrected pulse number data CND, CNL or CNR is obtained (in step 1003) by subtracting the pulse number correction value CTW3 from the previously retrieved pulse number ND, NL or NR (FIG. 25 showing the case where the ND has been retrieved). For preventing the corrected pulse number data CND, CNL or CNR from taking a negative value, a determination is made whether the corrected pulse number data CND, CNL or CNR is positive or not (in step 1004) and if the corrected pulse number data is negative, the corrected pulse number data is given a zero value (in step 1006). If, in step 1001, the actual coolant temperature TW is greater than or equal to the predetermined temperature TWo, the corrected pulse number CND, CNL or CNR is given the corresponding one of the actual pulse number ND, NL and NR (in step 1005). The corrected pulse number CND thus given and the actual pulse number ND have a relationship as illustrated in FIG. 26. That is, ND is equal to CND as shown by the line A if TW is greater than or equal to TWo, and if TW is less than TWo, the more the actual coolant temperature TW decreaes, the more the corrected pulse number data CND decreases for the same retrieved pulse number ND as shown by the line B and line C. If the setting is such that TWo=60° C., the line A corresponds to the temperatures above 60° C., the line B corresponds to 35° C. and the line C corresponds to 10° C. After the completion of the execution of these steps, the execution of the step 778 and the following steps shown in FIGS. 9(a) and 9(b) is initiated.

This embodiment provides similar operation and effect to those given by the preceding embodiment because a large reduction ratio as compared to the ordinary case is given when the engine coolant temperature is low as a result of providing a small desired pulse number data as compared to the ordinary case under this operating condition.

The fourth embodiment is hereinafter described in connection with FIG. 27 and FIGS. 9(a) and 9(b) as well.

Figure 27:
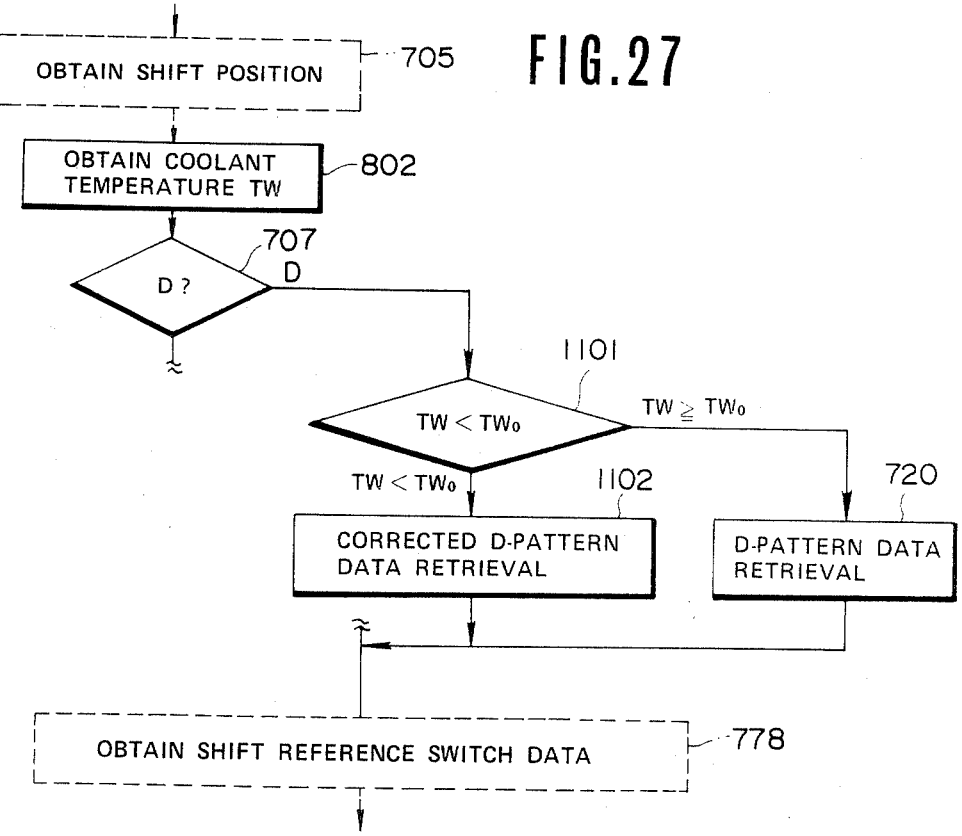
FIG. 27 is a view showing a portion of a flow chart of a stepper motor control routine of a fourth embodiment according to the present invention.

This embodiment results from replacing the steps 802, 803, 805A, 806, 707, 709, 711, 720, 740, and 760 shown in FIGS. 9(a) and 9(c) with the solid line drawn steps shown in FIG. 27 and provides similar operation and effect to those given by the first embodiment by retrieving corrected shift pattern data when the engine coolant temperature is low. FIG. 27 illustrates steps only which relates to the case when D range is selected and steps relating to the case when L range or R range is selected are omitted because the operation is substantially similar to the case when the D range is selected.

After the completion of the step 705, the actual engine coolant temperature TW is obtained from the engine coolant temperature sensor 306 in step 802 shown in FIG. 27, then a determination is made whether D range is selected or not (in step 707), and if the D range is selected, a decision is made whether the actual coolant temperature TW is less than the predetermined value TWo or not (in step 1001), and if the actual engine coolant temperature TW is less than the predetermined value TWo, the retrieval of a corrected shift pattern data is effected (in step 1102). If the actual coolant temperature TW is greater than or equal to the predetermined value TWo, the retrieval of the ordinary shift pattern data is effected (in step 720). Then, the execution of the step 778 and the following steps shown in FIGS. 9(a) and 9(b) is initiated. The corrected D range shift pattern data provides a reduction ratio larger than a reduction ratio given by the ordinary D range shift pattern data. Apparently, this embodiment provides the similar operation and effect to those given by the preceding embodiment because the relatively larger reduction ratio is given when the engine coolant temperature is low.

Although the above description has been directed to the steps only relating the case when the D range is selected. Brief explanation is made as to the steps relating to the case when L range or R range is selected. If L range or R range is selected, a determination is made whether TW is less than TWo. If TW is less than TWo, a corrected shift pattern data retrieval is executed and if TW is greater than or equal to TWo, the ordinary shift pattern data retrieval is executed.

Hereinafter, the fifth embodiment is described in connection with FIG. 28 and FIGS. 9(a) and 9(b) as well.

Figure 28:
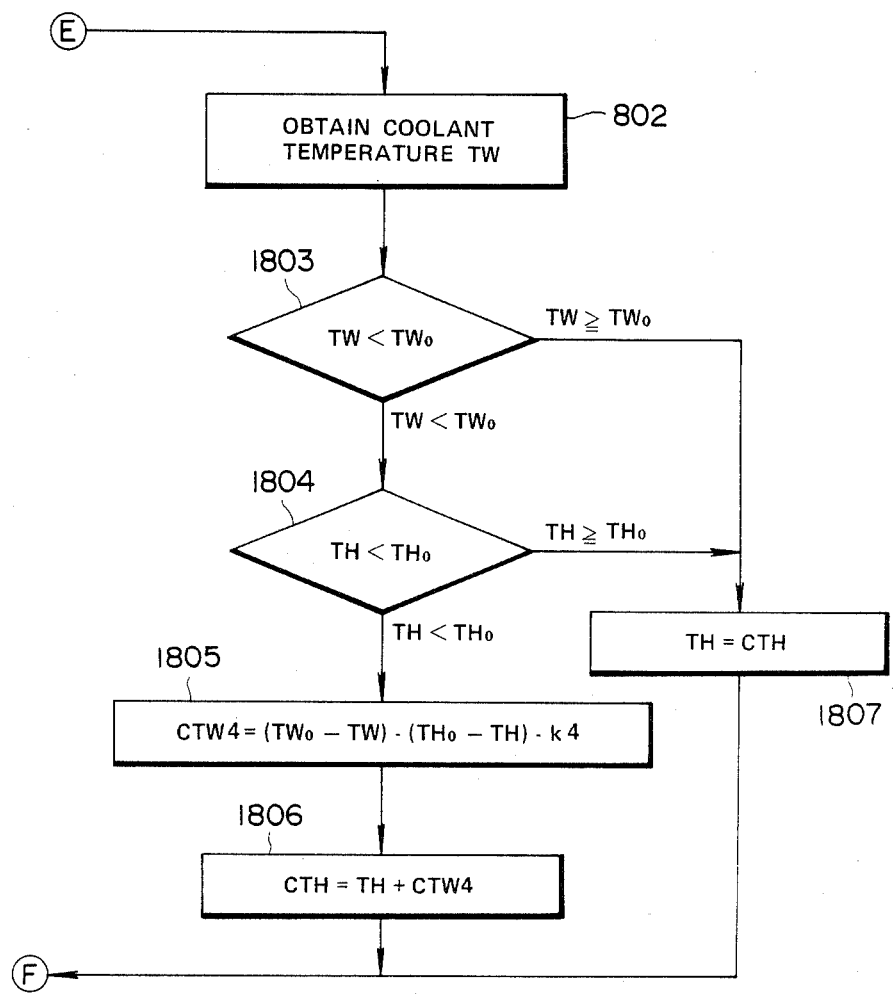
FIG. 28 is a view similar to FIG. 9(c) showing a portion of a flow chart of a stepper motor control routine of a fifth embodiment according to the present invention.

The fourth embodiment described in connection with FIG. 28 is substantially similar to the first embodiment described in connection with FIGS. 9(a), 9(b) and 9(c) except for the manner of obtaining the corrected throttle opening degree CTH. In this embodiment, the corrected throttle opening degree CTH is obtained by steps 802, 1803, 1804, 1805, 1806 and 1807 which will be described hereinafter.

Figure 29:
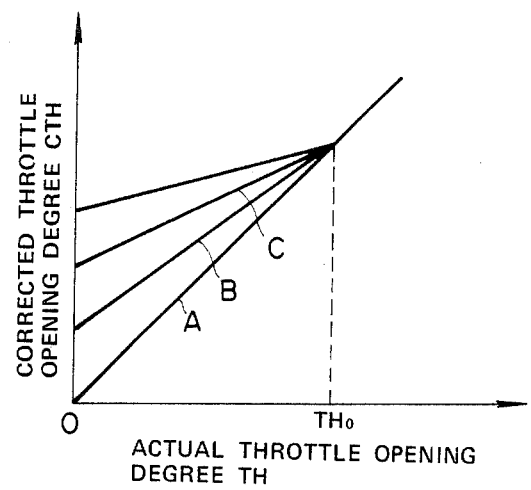
FIG. 29 is a graph showing a relationship between an actual throttle opening degree indicative signal TH and a corrected throttle opening degree indicative signal CTH.

Referring to FIG. 9(a), if the lock-up solenoid 200 is actuated (in step 699), the throttle opening degree is obtained from the throttle opening degree sensor 303 (in step 701), then the vehicle speed V is obtained from the vehicle speed sensor (in step 703), and then the shift position is obtained from the shift position switch 304 (in step 705). Referring to FIG. 28, the actual engine coolant temperature TW is obtained from the engine coolant temperature sensor 306 (in step 1802) after the step 705, a determination is made whether or not the actual coolant temperature TW is less than a predetermined temperature value TWo (in step 1803), and if the TW is less than the TWo, a determination is made whether the throttle opening degree TH is less than a predetermined throttle opening degree value THo (in step 1804). If TH is less than THo, a difference between the predetermined value THo and the throttle opening degree TH, i.e., (TWo-TW), is multiplied with a difference between the predetermined value THo and the throttle opening degree TH, i.e., (THo-TH), and also with a coefficient k4 to give a throttle opening degree correction value CTW4 (in step 1805) and in the subsequent step 1806 the throttle opening degree correction value CTW4 is added to the throttle opening degree TH to give a corrected throttle opening degree CTH. If, in the step 1803, TW is greater or equal to TWo, or in the step 1804, TH is greater or equal to THo, the corrected throttle opening degree CTH is given the actual throttle opening degree TH (in step 8007). FIG. 29 illustrates the relationship between the corrected throttle opening degree CTH and the actual throttle opening degree TH. That is, if TW is greater or equal to TWo, TH is equal to CTH as shown by the line A, and if TW is less than TWo, the more the throttle opening degree TH decreases, the more the corrected throttle opening degree CTH increases for the same throttle opening degree TH as shown by the line B and line C. For example, if the setting is such that TWo=60° C., the line A corresponds to the temperatures higher than 60° C., the line B corresponds to 35° C., and the line C corresponds to 10° C. Then, a determination is made whether the D range is selected in step 707 shown in FIG. 9(a), and if the D range is selected, D range shift pattern retrieval routine is executed in step 720, the following steps are quite the same as the counterparts in the first embodiment.

The above description has been directed to the operating condition when the engine coolant temperature TW is greater than or equal to the predetermined value TWo wherein the throttle opening degree TH is equal to the corrected throttle opening degree CTH. If TW is less than TWo, the actual throttle opening degree TH is less than the corrected throttle opening degree CTH, and the shift pattern retrieval is effected based on the corrected throttle opening degree CTH. Since each of the shift patterns for the respective D range, L range and R range provides a larger reduction ratio for the same vehicle speed as the throttle opening degree increases, a relatively large reduction ratio is given when the engine coolant temperature is low and at the same time the throttle opening degree is small. This results in an increase in the engine revolution speed, thus eliminating engine vibration and the power shortage which otherwise would take place when the engine operates irregularly upon start-up of the cold engine.

The above description has been directed mainly to the shift pattern to be selected upon selecting D range, but all that is necessary for operation in the L or R range is to give data relating to different shift patterns from that in the D range. For example, for the same throttle opening degree a shift pattern for the L range is designed to give a larger reduction ratio as compared to the reduction ratio which is given by the shift pattern for the D range for the purpose of enhancing acceleration performance and ensuring adequate engine braking performance at zero throttle opening degree. In a shift pattern for the L range, a reduction ratio larger than the reduction ratio given by the shift pattern for the L range is given for the same throttle opening degree. These shift patterns can be accomplished simply by inputting of predetermined data. Explanation of operation in the L and the R ranges is omitted since basic actions relating to the control are the same as in the D range.

Next, the sixth embodiment is described in connection with FIG. 30 and FIGS. 9(a) and 9(b) as well.

Figure 30:
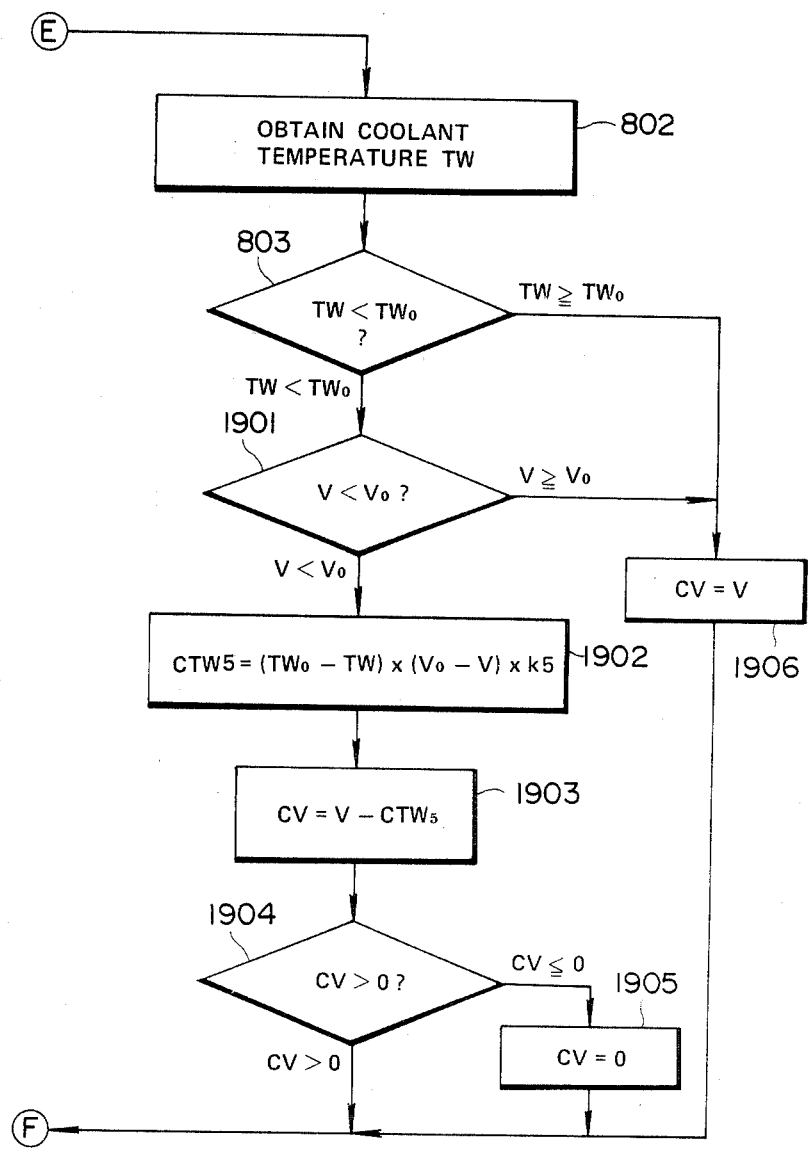
FIG. 30 is a view similar to FIG. 9(c) showing a portion of a flow chart of a stepper motor control routine of a sixth embodiment according to the present invention.

This embodiment is substantially the same as the first embodiment except that instead of the steps 802 to 805 shown in FIG. 9(c) have replaced with steps 802, 803, 1901, 1902, 1903, 1904, 1905 and 1906 shown in FIG. 30. In the sixth embodiment the vehicle speed signal is corrected.

Figure 31:
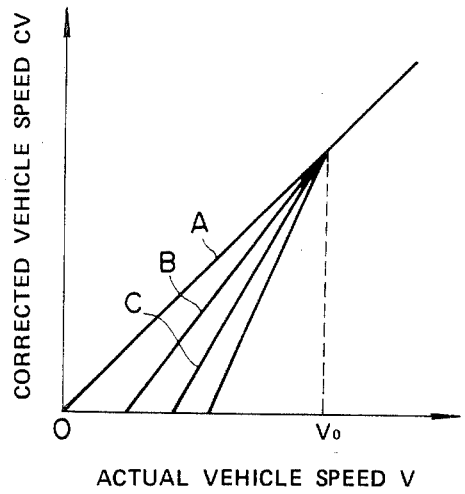
FIG. 31 is a graph showing a relationship between an actual vehicle speed indicative signal V and a corrected vehicle speed indicative signal CV.

After the completion of the step 705 shown in FIG. 9(a), an actual engine coolant temperature TW is obtained from the engine coolant temperature sensor 306 in step 802 shown in FIG. 30, then a determination is made whether or not the actual coolant temperature TW is less than a predetermined temperature value TWo (in step 803). If the actual coolant temperature TW is less than TWo, a determination is made whether or not the vehicle speed V is less than a predetermined value Vo (in step 1901). Then if V is less than Vo, a difference between the predetermined value TWo and the actual coolant temperature TW, i.e., (TWo-TW), is multiplied with a difference between the predetermined value Vo and the vehicle speed V, i.e., (Vo-V), and also with a predetermined coefficient k5 to give a vehicle speed correction value CTW5 (in step 1902), then in the next step 1903 the vehicle speed correction value CTW5 is subtracted from the vehicle speed V to give a corrected vehicle speed CV. Then, a determination is made whether or not the corrected vehicle speed CV is positive or not (in step 1904) in order to prevent the corrected vehicle speed CV from taking a negative value, and if the corrected vehicle speed CV has turned out to be negative, the CV is given a zero value (in step 1905). If TW is greater than or equal to TWo in step 803 or V is greater than or equal to Vo in step 1901, the corrected vehicle speed CV is given the actual vehicle speed V (in step 1906). The relationship between the corrected vehicle speed CV obtained as above and the actual vehicle speed V is shown in FIG. 31. That is, if TW is greater than or equal to TWo, V is equal to CV as shown by the line A, and if TW is less than TWo, the more the TW decreases, the more the corrected vehicle speed CV decreases for same actual vehicle speed V as illustrated by the line B and line C. For example, if the setting is such that TW0=60° C., the line A corresponds to temperatures higher than 60° C., the line B corresponds to 35° C. and the line C corresponds to 10° C. After this processing, the step 707 and its following steps shown in FIGS. 9(a) and 9(b) are executed.

Since each of the shift patterns for the respective ranges provides a reduction ratio which increases as the vehicle speed decreases for the same throttle opening degree, if the execution of retrieval is carried out based on the vehicle speed which has been corrected to have a small value as compared to the ordinary case when the engine coolant temperature is low, a reduction ratio is obtained which is larger than a reduction ratio obtained in the ordinary case.

Next, the seventh embodiment is described in connection with FIGS. 32(a) and 32(b).

Figure 32A:
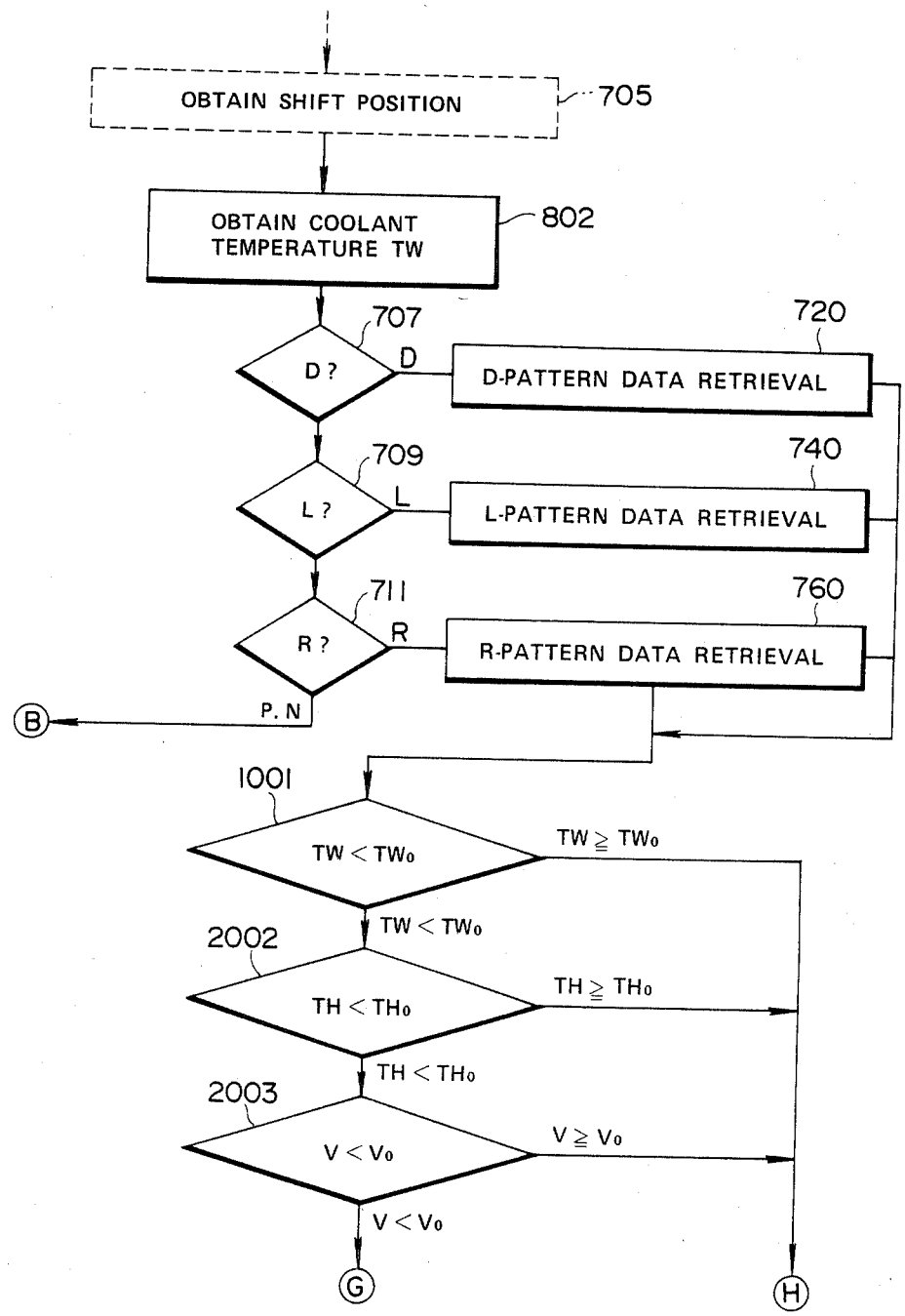
FIGS. 32(a) and 32(b) illustrate a portion of a flow chart of a stepper motor control routine of a seventh embodiment according to the present invention.
Figure 32B:
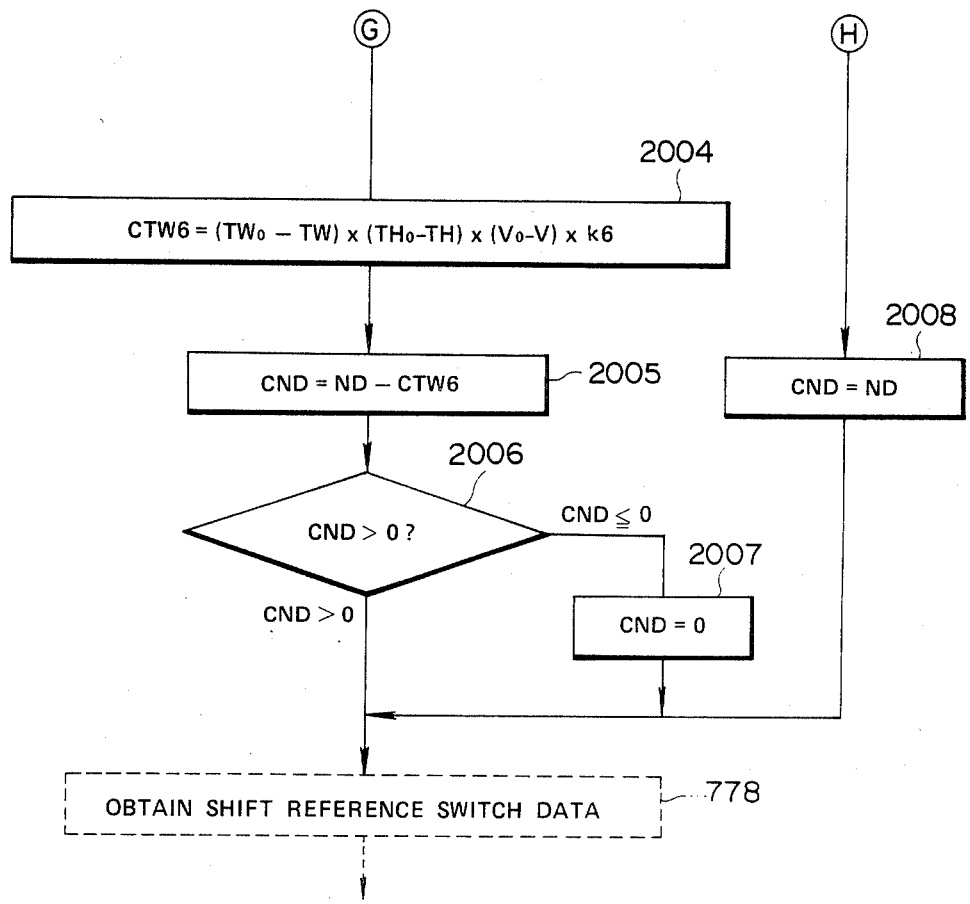

This embodiment results from replacing the steps 803, 804, 806 (see FIG. 9(c)), 707, 709, 711, 720, 740 and 760 (see FIG. 9(a)) with steps shown in FIGS. 32(a) and 32(b). In the seventh embodiment, the stepper motor pulse number is directly connected.

Referring to FIGS. 32(a) and 9(a), after the completion of the step 705, the actual engine coolant temperature TW is obtained from the engine coolant temperature sensor 306 (in step 802), and then one of D, L or R range pattern retrieval is carried out which corresponds to that one of D, L and R ranges which has been selected (in steps 707, 709, 711, 720, 740 and 760). Subsequently, a determination is made whether the actual coolant temperature TW is less than a predetermined temperature value TWo (in step 1001). If the TW is less than TWo, a determination is made whether the throttle opening degree TH is less than a predetermined throttle opening degree value THo (in step 2002). If TH is less than THo, a determination is made whether the vehicle speed V is less than a predetermined vehicle speed value Vo (in step 2003). If V is less than Vo, a pulse number correction value CTW6 is obtained (in step 2004) by multiplying a difference between the throttle opening degree TH and the predetermined value THo, i.e., (THo-TH), with a difference between a predetermined value Vo and the vehicle speed V, i.e., (Vo-V), and also with a predetermined coefficient k6. In the next step 2005, a corrected pulse number data CND, CNL or CNR is obtained by subtracting the pulse number correction value CTW6 from the pulse number ND, NL or NR which has been retrieved (only ND being illustrated in FIGS. 32(a) and 32(b)). Then, a determination is made whether the corrected pulse number data CND, CNL or CNR is positive or not (in step 2006) and if the corrected pulse number data is negative, it is given a zero value (in step 2007). If TW is greater than or equal to TWo in step 1001 or if TH is greater than or equal to THo in step 1002 or if V is greater than or equal to Vo in step 1003, the corrected pulse number pulse CND, CNL or CNR is given the actual pulse number ND, NL or NR (in step 2008). After the series of processings, the execution of step 778 and the following steps shown in FIG. 9(b) is initiated.

Since, in this embodiment, the pulse number data is given a value smaller than that obtained in the ordinary case when the engine coolant temperature is low and at the same time the vehicle speed is low, a reduction ratio larger than that obtained in the ordinary case is given, thus providing the similar operation and effect to any one of the previous embodiments.

What is claimed is:

1. A method for controlling a reduction ratio of a continuously variable transmission of an automotive vehicle having an internal combustion engine, comprising:

(a) generating an actual engine coolant temperature indicative signal representing an actual engine coolant temperature;
(b) comparing the engine coolant temperature indicative signal with a predetermined temperature value indicative signal representing a predetermined temperature value;
(c) detecting an operating condition under which the automotive vehicle is operating;
(d) generating a desired optimum reduction ratio indicative signal representing a desired optimum reduction ratio for the operating condition detected in said detecting step, the desired optimum reduction ratio indicative signal varying in a first pattern when the engine coolant temperature indicative signal is at least equal to said predetermined temperature value and in a second pattern when the engine coolant temperature indicative signal is less than the predetermined temperature value indicative signal, said second pattern giving a desired optimum reduction ratio larger than a desired optimum reduction ratio given by the first pattern for the same operating condition detected in said detecting step;
(e) adjusting the actual reduction ratio of the continuously variable transmission toward a value which agrees with the desired optimum reduction ratio; and
(f) repeating the steps (a), (b), (c), (d) and (e) until the actual reduction ratio agrees with said desired optimum reduction ratio, wherein the desired optimum reduction ratio given by the first pattern is determined based upon an operating variable indicative signal partly representing the operating condition detected in said detecting step, and the desired optimum reduction ratio given by the second pattern is determined based upon a corrected signal given by correcting said operating variable indicative signal by a predetermined value.

2. A method as claimed in claim 1, wherein said operating variable indicative signal represents one of the vehicle speed of the automotive vehicle and the engine load on the internal combustion engine.

3. A method for controlling a reduction ratio of a continuously variable transmission of an automotive vehicle having an internal combustion engine, comprising:

(a) generating an actual engine coolant temperature indicative signal representing an actual engine coolant temperature;
(b) comparing the engine coolant temperature indicative signal with a predetermined temperature value indicative signal representing a predetermined temperature value;
(c) detecting an operating condition under which the automotive vehicle is operating;
(d) generating a desired optimum reduction ratio indicative signal representing a desired optimum reduction ratio for the operating condition detected in said detecting step, the desired optimum reduction ratio indicative signal varying in a first pattern when the engine coolant temperature indicative signal is at least equal to said predetermined temperature value and in a second pattern when the engine coolant temperature indicative signal is less than the predetermined temperature value indicative signal, said second pattern giving a desired optimum reduction ratio larger than a desired optimum reduction ratio given by the first pattern for the same operating condition detected in said detecting step;

(e) adjusting the actual reduction ratio of the continuously variable transmission toward a value which agrees with the desired optimum reduction ratio; and (f) repeating the steps (a), (b), (c), (d) and (e) until the actual reduction ratio agrees with said desired optimum reducing ratio, wherein said at least one operating condition is represented by an engine load indicative signal and a vehicle speed indicative signal, wherein the desired optimum reduction ratio indicative signal data are stored in a memory for a set of the engine load indicative signal and the vehicle speed indicative signal, and wherein the desired optimum reduction ratio given by the second pattern is determined based upon a corrected signal obtained by correcting the engine load indicative signal.

4. A method for controlling a reduction ratio of a continuously variable transmission of an automotive vehicle having an internal combustion engine, comprising:

(a) generating an actual engine coolant temperature indicative signal representing an actual engine coolant temperature;

(b) comparing the engine coolant temperature indicative signal with a predetermined temperature value indicative signal representing a predetermined temperature value;

(c) detecting an operating condition under which the automotive vehicle is operating;

(d) generating a desired optimum reduction ratio indicative signal representing a desired optimum reduction ratio for the operating condition detected in said detecting step, the desired optimum reduction ratio indicative signal varying in a first pattern when the engine coolant temperature indicative signal is at least equal to said predetermined temperature value and in a second pattern when the engine coolant temperature indicative signal is less than the predetermined temperature value indicative signal, said second pattern giving a desired optimum reduction ratio larger than a desired optimum reduction ratio given by the first pattern for the same operating condition detected in said detecting step;

(e) adjusting the actual reduction ratio of the continuously variable transmission toward a value which agrees with the desired optimum reduction ratio; and (f) repeating the steps (a), (b), (c), (d) and (e) until the actual reduction ratio agrees with said desired optimum reduction ratio, wherein said at least operating condition is represented by an engine load indicative signal and a vehicle speed indicative signal, wherein the desired optimum reduction ratio data are stored in a memory for a set of the engine load indicative signal and the vehicle speed indicative signal, and wherein the desired optimum reduction ratio given by the second pattern is determined based upon a corrected signal obtained by correcting the vehicle speed indicative signal.

5. A method for controlling a reduction ratio of a continuously variable transmission of an automotive vehicle having an internal combustion engine, comprising:

(a) generating an actual engine coolant temperature indicative signal representing an actual engine coolant temperature;

(b) comparing the engine coolant temperature indicative signal with a predetermined temperature value indicative signal representing a predetermined temperature value;

(c) detecting an operating condition under which the automotive vehicle is operating;

(d) generating a desired optimum reduction ratio indicative signal representing a desired optimum reduction ratio for the operating condition detected in said detecting step, the desired optimum reduction ratio indicative signal varying in a first pattern when the engine coolant temperature indicative signal is at least equal to said predetermined temperature value and in a second pattern when the engine coolant temperature indicative signal is less than the predetermined temperature value indicative signal, said second pattern giving a desired optimum reduction ratio larger than a desired optimum reduction ratio given by the first pattern for the same operating condition detected in said detecting step;

(e) adjusting the actual reduction ratio of the continuously variable transmission toward a value which agrees with the desired optimum reduction ratio; and (f) repeating the steps (a), (b), (c), (d) and (e) until the actual reduction ratio agrees with said desired optimum reduction ratio, wherein said at least one operating condition is represented by an engine load indicative signal and a vehicle speed indicative signal, wherein the desired optimum reduction ratio indicative signal data are stored in a memory for a set of the engine load indicative signal and the vehicle speed indicative signal, and wherein the desired optimum reduction ratio given by the second pattern is given by correcting a desired optimum reduction ratio indicative signal obtained by retrieving the desired reduction ratio indicative signal data based on the engine load indicative signal and the vehicle speed indicative signal.

6. A method for controlling a reduction ratio of a continuously variable transmission of an automotive vehicle having an internal combustion engine, comprising:

(a) generating an actual engine coolant temperature indicative signal representing an actual engine coolant temperature;

(b) comparing the engine coolant temperature indicative signal with a predetermined temperature value indicative signal representing a predetermined temperature value;

(c) detecting an operating condition under which the automotive vehicle is operating;

(d) generating a desired optimum reduction ratio indicative signal representing a desired optimum reduction ratio for the operating condition detected in said detecting step, the desired optimum reduction ratio indicative signal varying in a first pattern when the engine coolant temperature indicative signal is at least equal to said predetermined temperature value and in a second pattern when the engine coolant temperature indicative signal is less than the predetermined temperature value indicative signal, said second pattern giving a desired optimum reduction ratio larger than a desired optimum reduction ratio given by the first pattern for the same operating condition detected in said detecting step;

(e) adjusting the actual reduction ratio of the continuously variable transmission toward a value which agrees with the desired optimum reduction ratio; and (f) repeating the steps (a), (b), (c), (d) and (e) until the actual reduction ratio agrees with said desired optimum reduction ratio, wherein said at least one operating condition is represented by an engine load indicative signal and a vehicle speed indicative signal, wherein the reduction ratio given by the second pattern is determined based upon a predetermined function having as a variable at least one of the actual engine coolant temperature indicative signal, the engine load indicative signal and the vehicle speed indicative signal, wherein the desired optimum reduction ratio indicative signal data are stored in a memory for a set of the engine load indicative signal and the vehicle speed indicative signal, and wherein the desired optimum reduction ratio given by the second pattern is determined based upon a corrected signal obtained by correcting the engine load indicative signal.

7. A method for controlling a reduction ratio of a continuously variable transmission of an automotive vehicle having an internal combustion engine, comprising:

(a) generating an actual engine coolant temperature indicative signal representing an actual engine coolant temperature;

(b) comparing the engine coolant temperature indicative signal with a predetermined temperature value indicative signal representing a predetermined temperature value;

(c) detecting an operating condition under which the automotive vehicle is operating;

(d) generating a desired optimum reduction ratio indicative signal representing a desired optimum reduction ratio for the operating condition detected in said detecting step, the desired optimum reduction ratio indicative signal varying in a first pattern when the engine coolant temperature indicative signal is at least equal to said predetermined temperature value and in a second pattern when the engine coolant temperature indicative signal is less than the predetermined temperature value indicative signal, said second pattern giving a desired optimum reduction ratio larger than a desired optimum reduction ratio given by the first pattern for the same operating condition detected in said detecting step;

(e) adjusting the actual reduction ratio of the continuously variable transmission toward a value which agrees with the desired optimum reduction ratio; and (f) repeating the steps (a), (b), (c), (d) and (e) until the actual reduction ratio agrees with said desired optimum reduction ratio, wherein said at least one operating condition is represented by an engine load indicative signal and a vehicle speed indicative signal, wherein the reduction ratio given by the second pattern is determined based upon a predetermined function having, as a variable, at least one of the actual engine coolant temperature indicative signal, the engine load indicative signal and the vehicle speed indicative signal, wherein the desired optimum reduction ratio indicative signal data are stored in a memory for a set of the engine load indicative signal and the vehicle speed indicative signal, and wherein the desired optimum reduction ratio given by the second pattern is determined based upon a corrected signal obtained by correcting the vehicle speed indicative signal.

8. A method for controlling a reduction ratio of a continuously variable transmission of an automotive vehicle having an internal combustion engine, comprising:

(a) generating an actual engine coolant temperature indicative signal representing an actual engine coolant temperature;

(b) comparing the engine coolant temperature indicative signal with a predetermined temperature value indicative signal representing a predetermined temperature value;

(c) detecting an operating condition under which the automotive vehicle is operating;

(d) generating a desired optimum reduction ratio indicative signal representing a desired optimum reduction ratio for the operating condition detected in said detecting step, the desired optimum reduction ratio indicative signal varying in a first pattern when the engine coolant temperature indicative signal is at least equal to said predetermined temperature value and in a second pattern when the engine coolant temperature indicative signal is less than the predetermined temperature value indicative signal, said second pattern giving a desired optimum reduction ratio larger than a desired optimum reduction ratio given by the first pattern for the same operating condition detected in said detecting step;

(e) adjusting the actual reduction ratio of the continuously variable transmission toward a value which agrees with the desired optimum reduction ratio; and (f) repeating the steps (a), (b), (c), (d) and (e) until the actual reduction ratio agrees with said desired optimum reduction ratio, wherein said at least one operating condition is represented by an engine load indicative signal and a vehicle speed indicative signal, wherein the reduction ratio given by the second pattern is determined based upon a predetermined function having, as a variable, at least one of the actual engine coolant temperature indicative signal, the engine load indicative signal and the vehicle speed indicative signal, wherein the reduction ratio indicative signal data are stored in a memory for a set of the engine load indicative signal and the vehicle speed indicative signal, and wherein the desired optimum reduction ratio given by the second pattern is determined based upon a corrected signal obtained by correcting a desired optimum reduction ratio obtained by retrieving the optimum desired reduction ratio signal data in response to the engine load indicative signal and the vehicle speed indicative signal.

9. A method for controlling a reduction ratio of a continuously variable transmission of an automotive vehicle having an internal combustion engine with a throttle which opens in degrees, comprising:

(a) detecting an engine temperature of the internal combustion engine and generating an actual engine temperature indicative signal;

(b) comparing said actual engine temperature indicative signal with a predetermined temperature value indicative signal indicative of a predetermined temperature value and generating a comparison result indicative signal indicating that the actual engine temperature is lower than said predetermined temperature value when said actual engine temperature indicative signal is lower than said predetermined temperature value indicative signal;

(c) detecting a plurality of operating condition variables representing an operating condition of the automotive vehicle and generating a plurality of operating condition variable indicative signals indicative of the plurality of operating condition variables detected;

(d) retrieving a desired optimum reduction ratio for said plurality of operating condition variable indicative signals and generating a desired optimum reduction ratio indicative signal;

(e) computing, responsive to said comparison result indicative signal, a deviation of said actual engine temperature indicative signal from said predetermined temperature value indicative signal and generating a deviation indicative signal;

(f) determining, responsive to said comparison result indicative signal, a correction value variable with said deviation indicative signal and generating a correction value indicative signal;

(g) correcting, responsive to said comparison result indicative signal, one of said plurality of operating condition variable indicative signal and said desired optimum reduction ratio indicative signal by said correction value indicated by said correction value indicative signal;

(h) adjusting the reduction ratio of the continuously variable transmission toward said desired optimum reduction ratio indicated by said desired optimum reduction ratio indicative signal;

(i) repeating the steps (a), (b), (c), (d) and (h) when said comparison result indicative signal is absent until the reduction ratio agrees with said desired optimum reduction ratio; and (j) repeating the steps (a), (b), (c), (d), (e), (f), (g) and (h) when said comparison result indicative signal is present until the reduction ratio agrees with said desired optimum reduction ratio.

10. A method as claimed in claim 9, wherein said plurality of operating condition variable indicative signals include a throttle opening degree indicative signal indicative of a throttle opening degree of the throttle, and wherein said correcting step corrects said throttle opening degree indicative signal as said one of said plurality of operating condition variable indicative signals and includes a step of increasing said throttle opening degree indicative signal by a value resulting from multiplying a coefficient with said deviation indicated by said deviation indicative signal.

11. A method as claimed in claim 9, wherein said plurality of operating condition variable indicative signals include a vehicle speed indicative signal indicative of a vehicle speed of the automotive vehicle, and wherein said correcting step corrects said vehicle speed indicative signal as said one of said plurality of operating condition variable indicative signals and includes a step of decreasing said vehicle speed indicative signal by a value resulting from multiplying a coefficient with said deviation indicated by said deviation indicative signal.

12. A method as claimed in claim 9, wherein said correcting step corrects said desired optimum reduction ratio indicative signal as said one of said plurality of operating condition variable indicative signals and includes a step of decreasing said desired optimum reduction ratio indicative signal by a value resulting from multiplying a coefficient with said deviation indicated by said deviation indicative signal.

13. A method as claimed in claim 9, wherein said plurality of operating condition variable indicative signals include a throttle opening degree indicative signal indicative of a throttle opening degree of the throttle, and wherein said correcting step corrects said throttle opening degree indicative signal as said one of said plurality of operating condition variable indicative signals and includes a step of increasing said throttle opening degree indicative signal by a value resulting from multiplying a coefficient with said deviation indicated by said deviation indicative signal and a deviation of said throttle opening degree indicative signal from a predetermined throttle opening degree value when said throttle opening degree indicative signal is lower than said predetermined throttle opening degree value.

14. A method as claimed in claim 9, wherein said plurality of operating condition variable indicative signals include a vehicle speed indicative signal indicative of a vehicle speed of the automotive vehicle, and wherein said correcting step corrects said vehicle speed indicative signal at said one of said operating condition variable indicative signals and includes a step of decreasing said vehicle speed indicative signal by a value resulting, from multiplying a coefficient with said deviation indicated by said deviation indicative signal and a deviation of said throttle opening degree indicative signal from a predetermined throttle opening degree value when said throttle opening degree indicative signal is lower than said predetermined throttle opening degree value.

15. A method as claimed in claim 9, wherein said operating condition variable indicative signals include a throttle opening degree indicative signal indicative of a throttle opening degree of the throttle and a vehicle speed indicative signal indicative of a vehicle speed of the automotive vehicle, and wherein said correcting step corrects said desired optimum reduction ratio indicative signal and includes a step of decreasing said desired optimum reduction ratio indicative signal by a value resulting from multiplying a coefficient with said deviation indicated by said deviation indicative signal, a deviation of said throttle opening degree indicative signal from a predetermined throttle opening degree value and a deviation of said vehicle speed indicative signal from a predetermined vehicle speed value when said throttle opening degree indicative signal is lower than said predetermined throttle opening degree value and said vehicle speed indicative signal is lower than said predetermined vehicle speed value.

16. An apparatus for controlling a reduction ratio of a continuously variable transmission of an automotive vehicle having an internal combustion engine with a throttle which opens in degrees, comprising:

means for detecting an engine temperature of the internal combustion engine and generating an actual engine temperature indicative signal;

means for detecting a plurality of operating condition variables representing an operating condition of the automotive vehicle and generating a plurality of operating condition variable indicative signals of the plurality of operating condition variables detected;

means for comparing said actual engine temperature indicative signal with a predetermined temperature value indicative signal indicative of a predetermined temperature value and generating a comparison result indicative signal indicating that the actual engine temperature is lower than said predetermined temperature value when said actual engine temperature indicative signal is lower than said predetermined temperature value indicative signal;

means for retrieving a desired optimum reduction ratio for said plurality of operating condition variable indicative signals and generating a desired optimum reduction ratio indicative signal;

means for calculating, responsive only when said comparison result indicative signal is present, a deviation of said actual engine temperature indicative signal from said predetermined temeperature value indicative signal and generating a deviation indicative signal;

means for determining, responsive to said comparison result indicative signal, a correction value variable as a function of said deviation indicative signal and generating a correction value indicative signal;

means for correcting, responsive to said comparison result indicative signal, one of said plurality of operating condition variable indicative signals and said desired optimum reduction ratio indicative signal by said correction value indicated by said correction value indicative signal; and means for adjusting the reduction ratio of the continuously variable transmission toward said desired optimum reduction ratio indicated by said desired optimum reduction ratio indicative signal.

* * * * *